United States Patent [19]
Suzuki

[11] Patent Number: 6,148,135
[45] Date of Patent: *Nov. 14, 2000

[54] VIDEO AND AUDIO REPRODUCING DEVICE AND VIDEO DECODING DEVICE

[75] Inventor: Mitsuyoshi Suzuki, Tokyo, Japan

[73] Assignee: Mitsubishi Denki Kabushiki Kaisha, Tokyo, Japan

[*] Notice: This patent is subject to a terminal disclaimer.

[21] Appl. No.: 08/912,644

[22] Filed: Aug. 18, 1997

Related U.S. Application Data

[63] Continuation-in-part of application No. 08/655,887, May 31, 1996, Pat. No. 5,808,722.

[30] Foreign Application Priority Data

Jan. 29, 1996 [JP] Japan .................................. 8-12769

[51] Int. Cl.[7] .................................................. G03B 31/00
[52] U.S. Cl. .............................. 386/12; 386/98; 348/423; 348/462; 348/512
[58] Field of Search ................................... 348/423, 515, 348/845.1–845.3, 464, 462, 512, 473, 484, 408; 386/39, 96, 98, 101, 104–106; 395/135, 12; 358/339

[56] References Cited

U.S. PATENT DOCUMENTS

| | | | |
|---|---|---|---|
| 4,832,481 | 5/1989 | Beauviala | 352/5 |
| 5,287,182 | 2/1994 | Haskell et al. | 348/484 |
| 5,325,125 | 6/1994 | Naimpally et al. | 348/408 |
| 5,481,543 | 1/1996 | Veltman | 348/423 |
| 5,502,573 | 3/1996 | Fujinami | 358/339 |
| 5,535,137 | 7/1996 | Rossmere et al. | 395/135 |
| 5,537,148 | 7/1996 | Fujinami | 348/473 |
| 5,598,352 | 1/1997 | Rosenau et al. | 348/423 |
| 5,808,722 | 9/1998 | Suzuki | 352/12 |
| 5,815,634 | 9/1998 | Daum et al. | 348/423 |
| 5,913,031 | 6/1999 | Blanchard | 395/512 |

OTHER PUBLICATIONS

"Coding Of Moving Pictures And Associated Audio", ISO/IECJTC1/SC29/WG11 N0802, Nov. 9, 1994.
"Coding Of Moving Pictures And Associated Audio", ISO/IECJTC1/SC29/WG11 N0801, Nov. 13, 1994.

*Primary Examiner*—Wendy Garber
*Assistant Examiner*—Thanh I. Pham
*Attorney, Agent, or Firm*—Leydig, Voit & Mayer

[57] ABSTRACT

The video and audio synchronization controller sets a system clock reference (SCR) included in the frame header portion of the coded video and audio data into a system time counter to set a timing of a system time clock (STC), immediately after a video and audio reproducing device has been powered on. The video and audio reproducing device decodes and displays a first arriving video data synchronous with a display system frame pulse, which is the closest to the value of a video time stamp included in a frame header of the first video frame on the time axis of the set STC. The video and audio synchronization controller sets again the value of the time stamp included in the first video frame to the system time counter to update the STC. The video and audio reproducing device outputs the video data for the second and subsequent video frames and all the audio data synchronous with the updated STC by outputting the video and audio data when the time indicated by the video and audio time stamps arrives on the time axis of the updated STC.

14 Claims, 28 Drawing Sheets

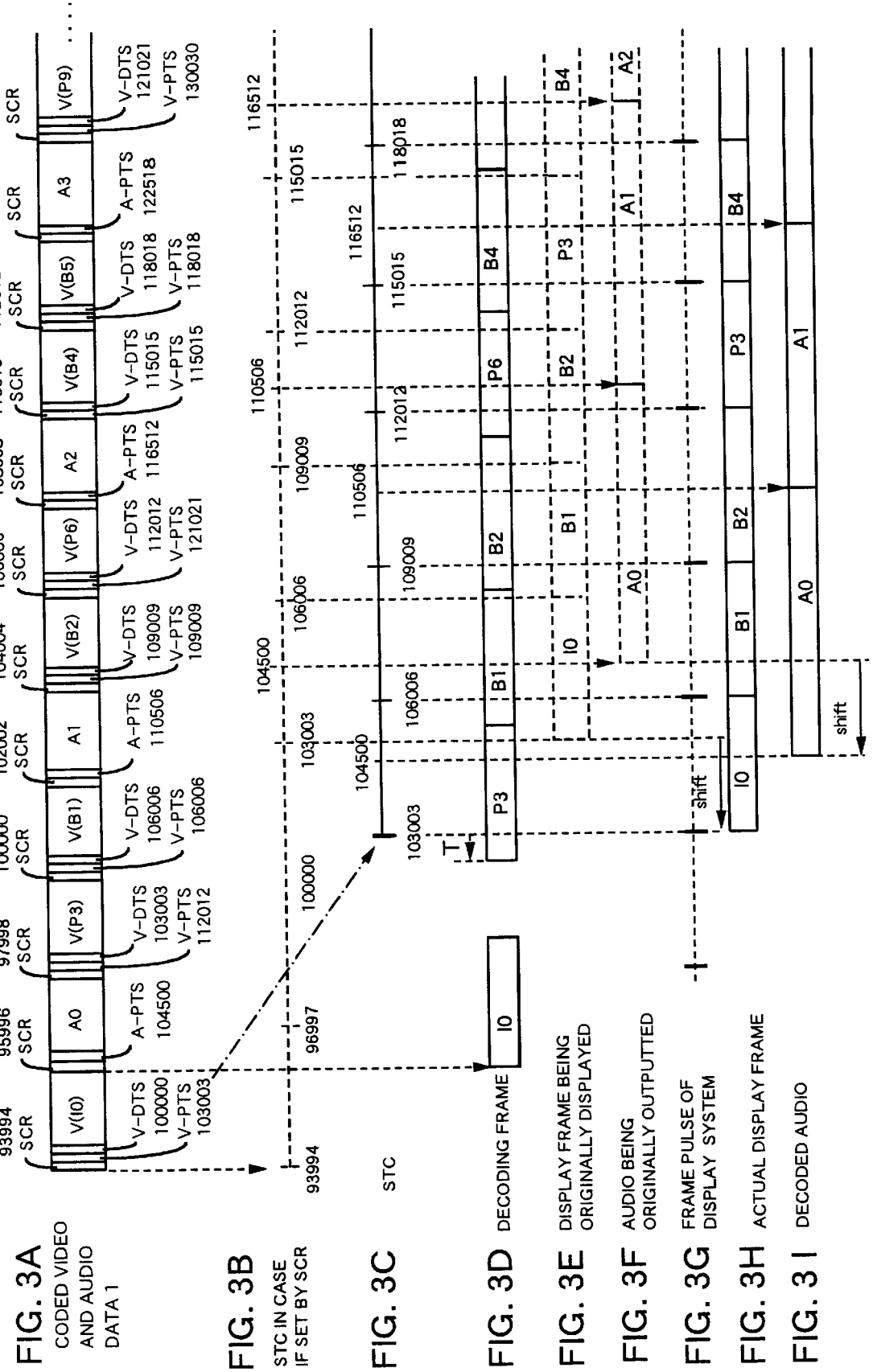

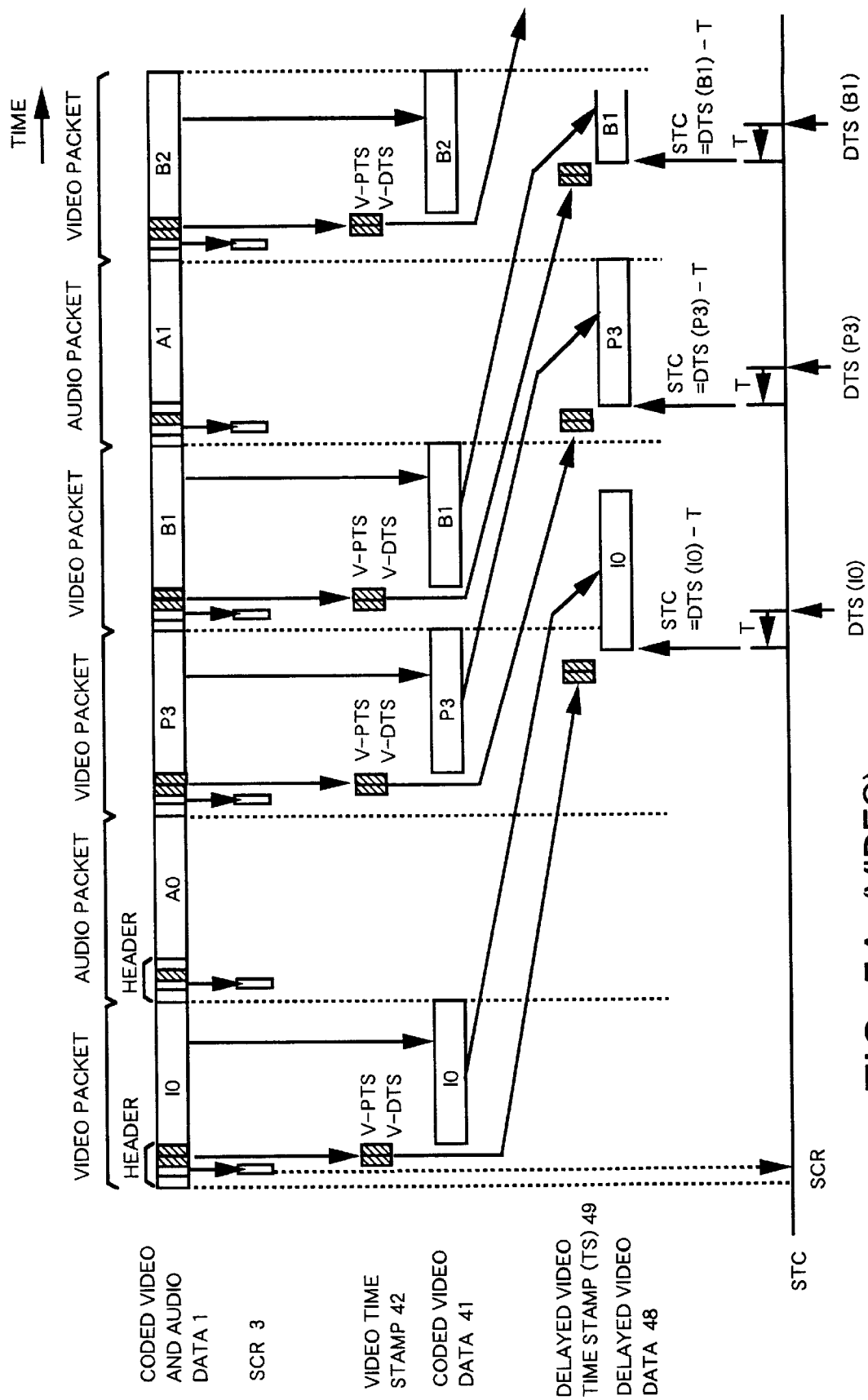
FIG. 5A (VIDEO)

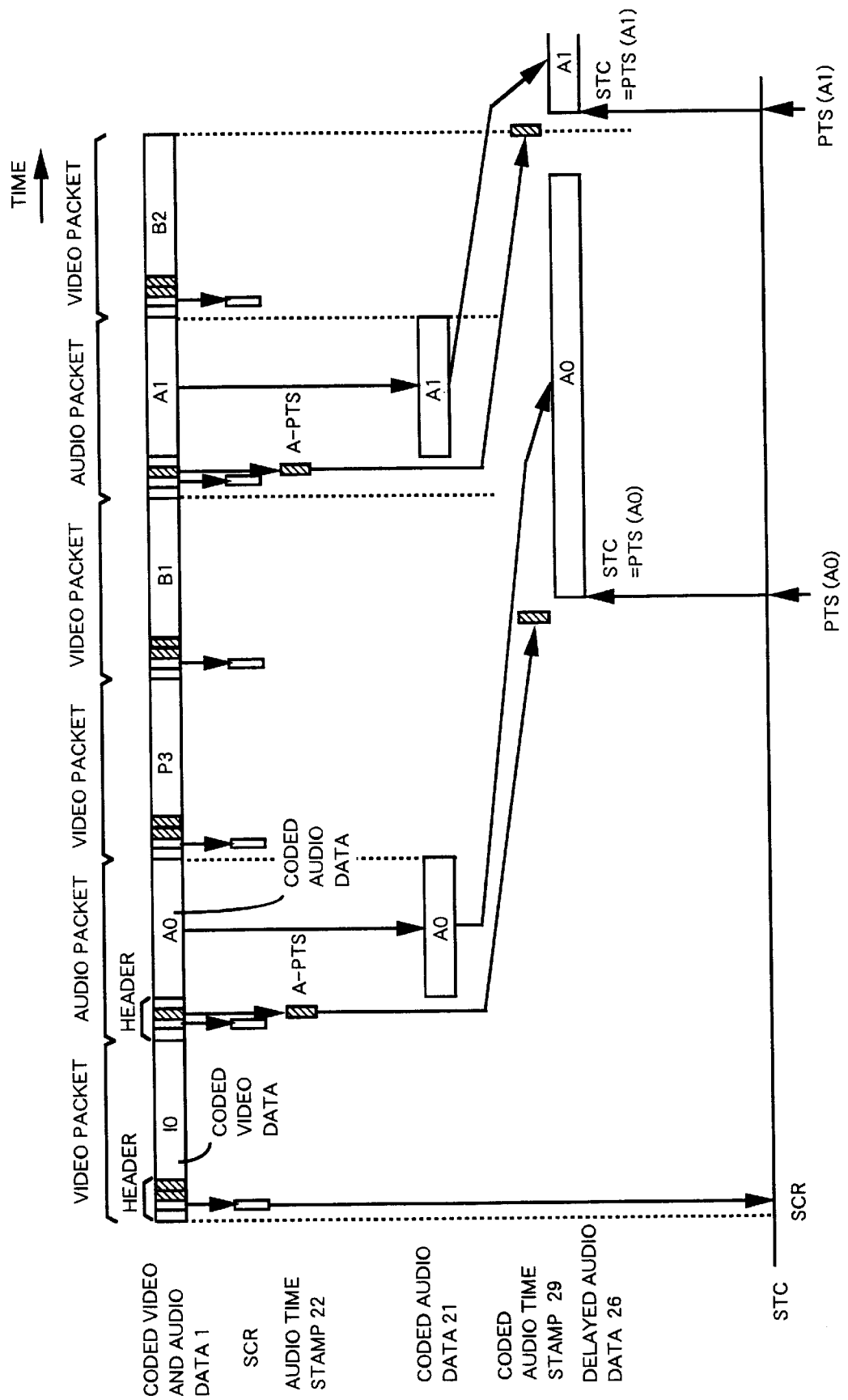
FIG. 5B (AUDIO)

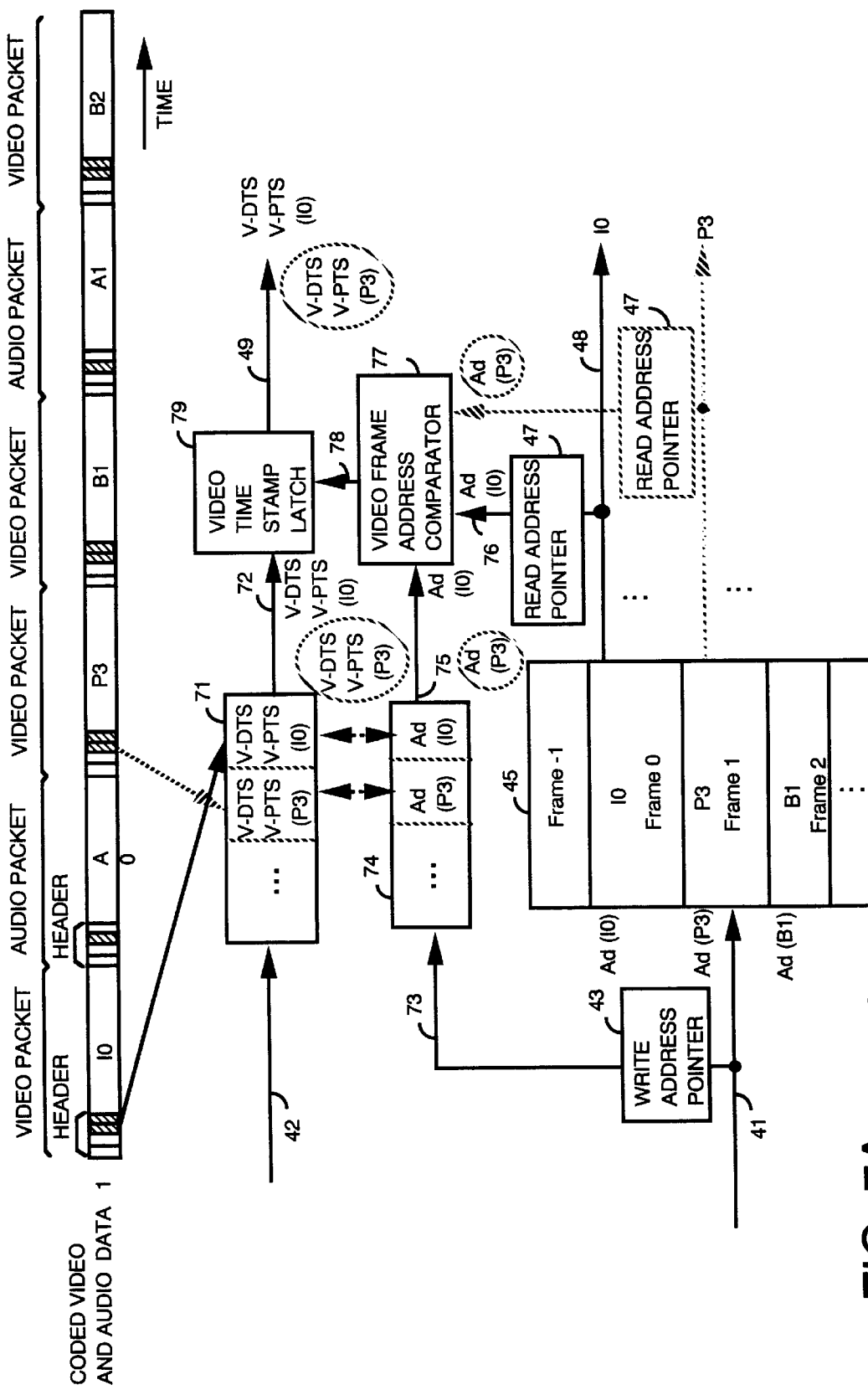
FIG. 7A (VIDEO)

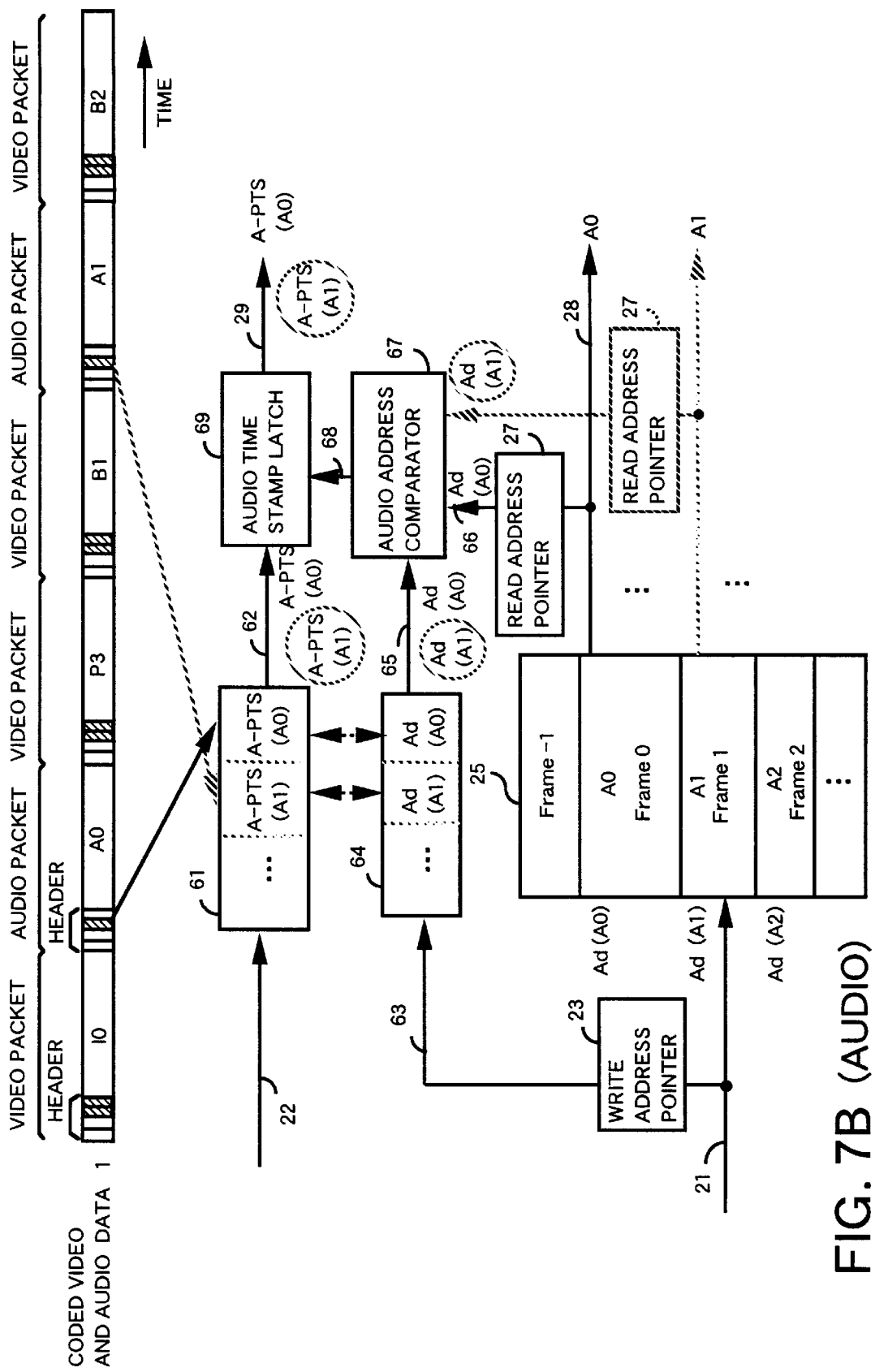
FIG. 7B (AUDIO)

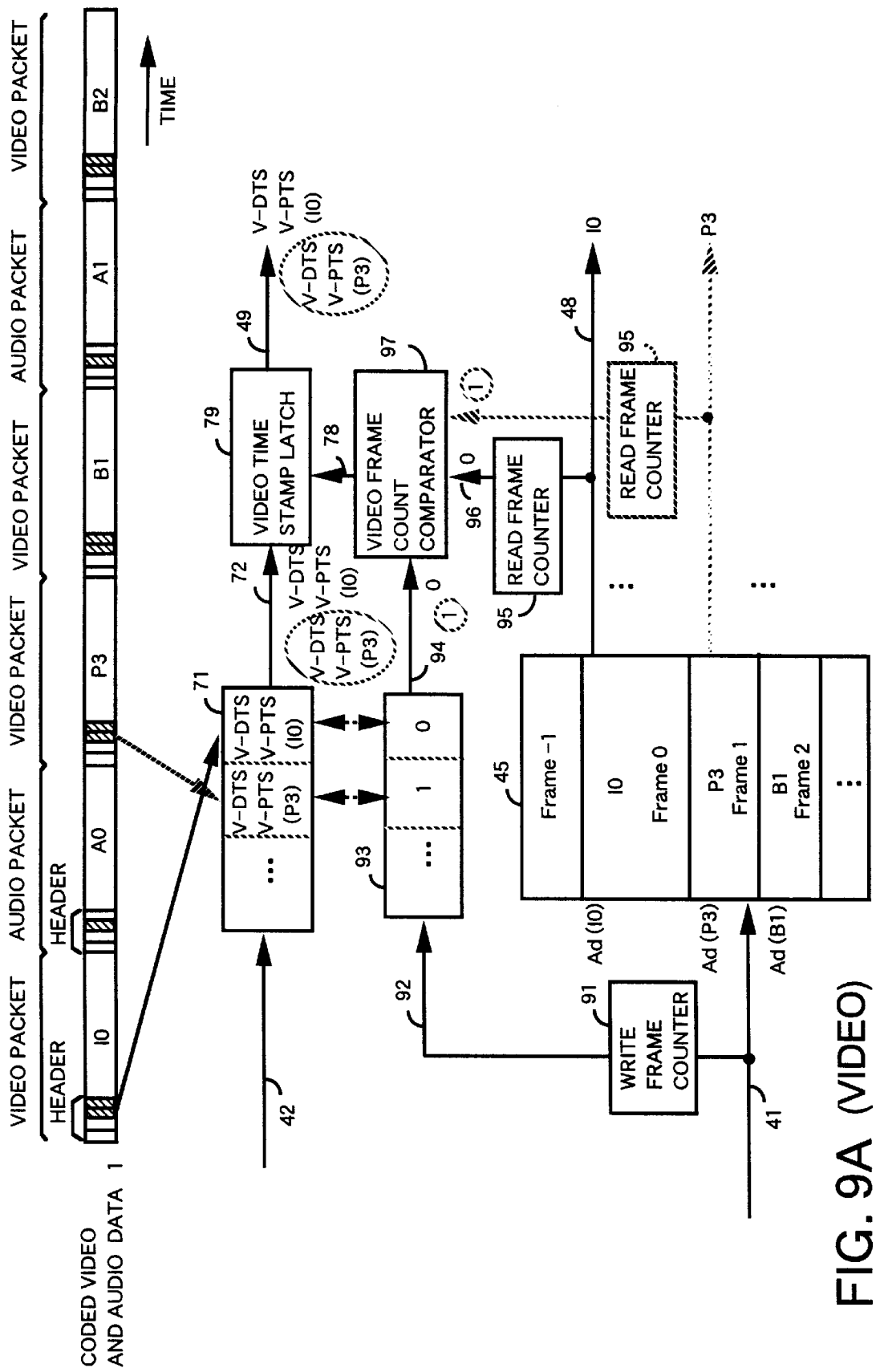
FIG. 9A (VIDEO)

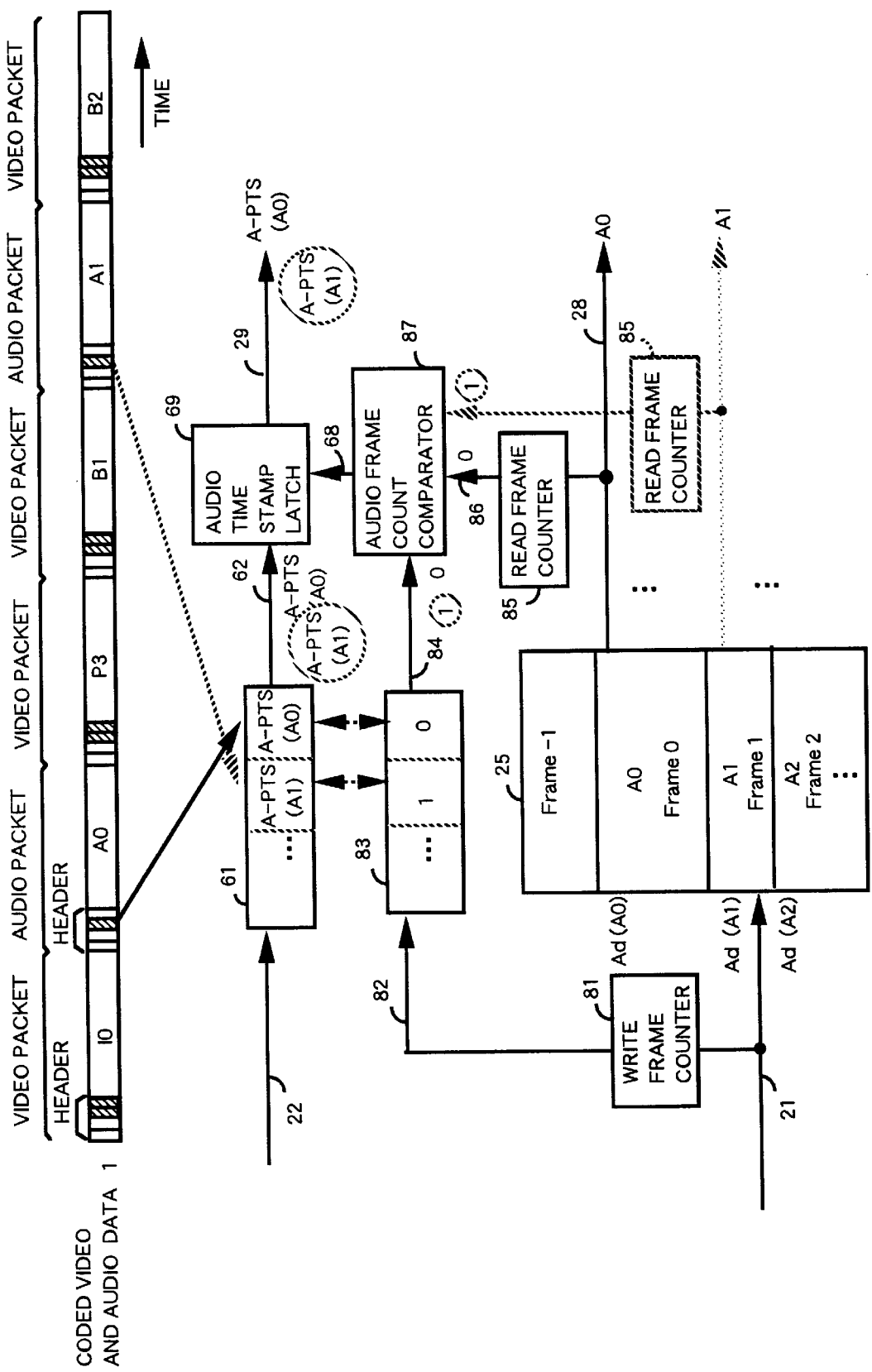
FIG. 9B (AUDIO)

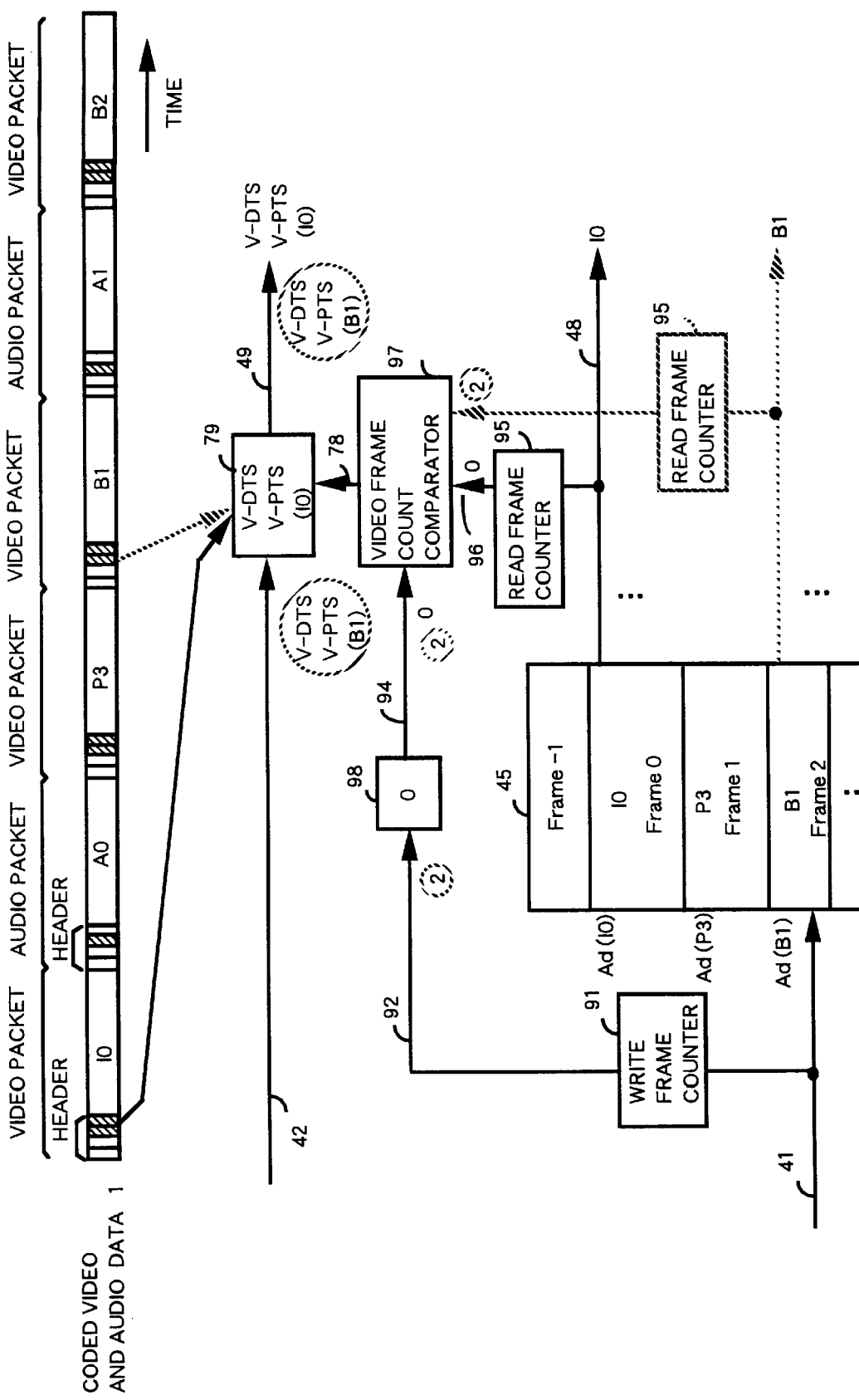
FIG. 11A (VIDEO)

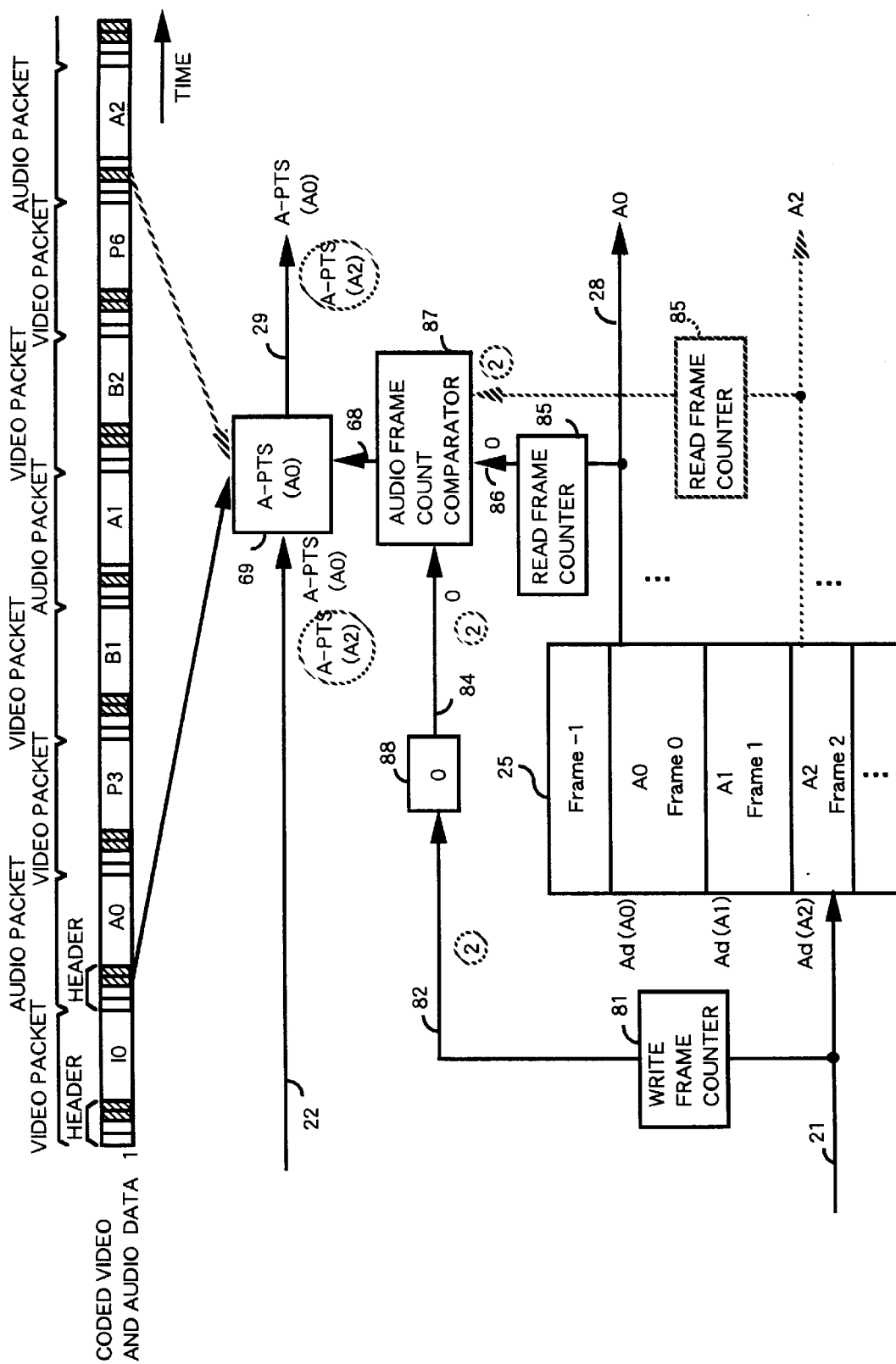
FIG. 11B (AUDIO)

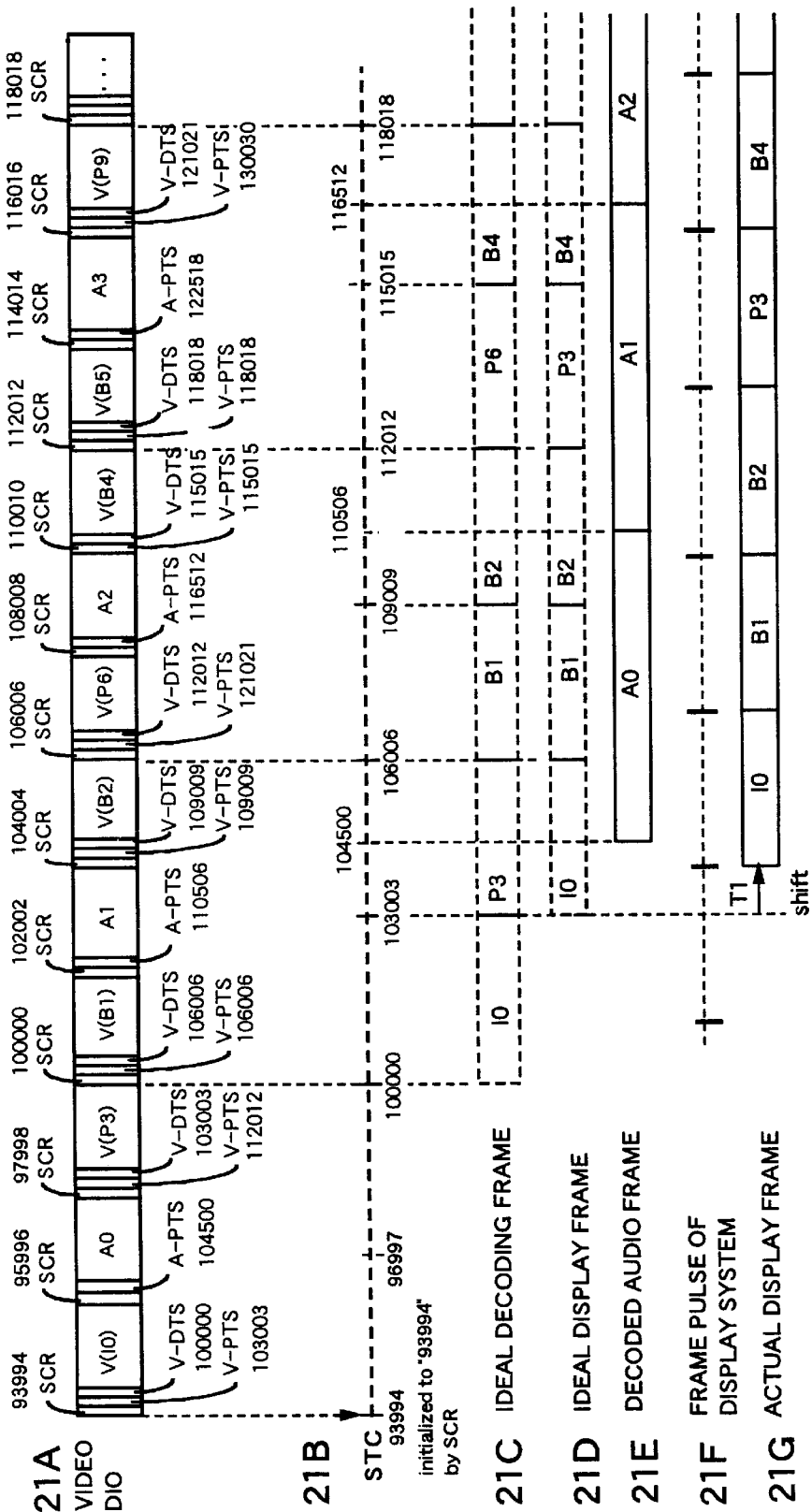

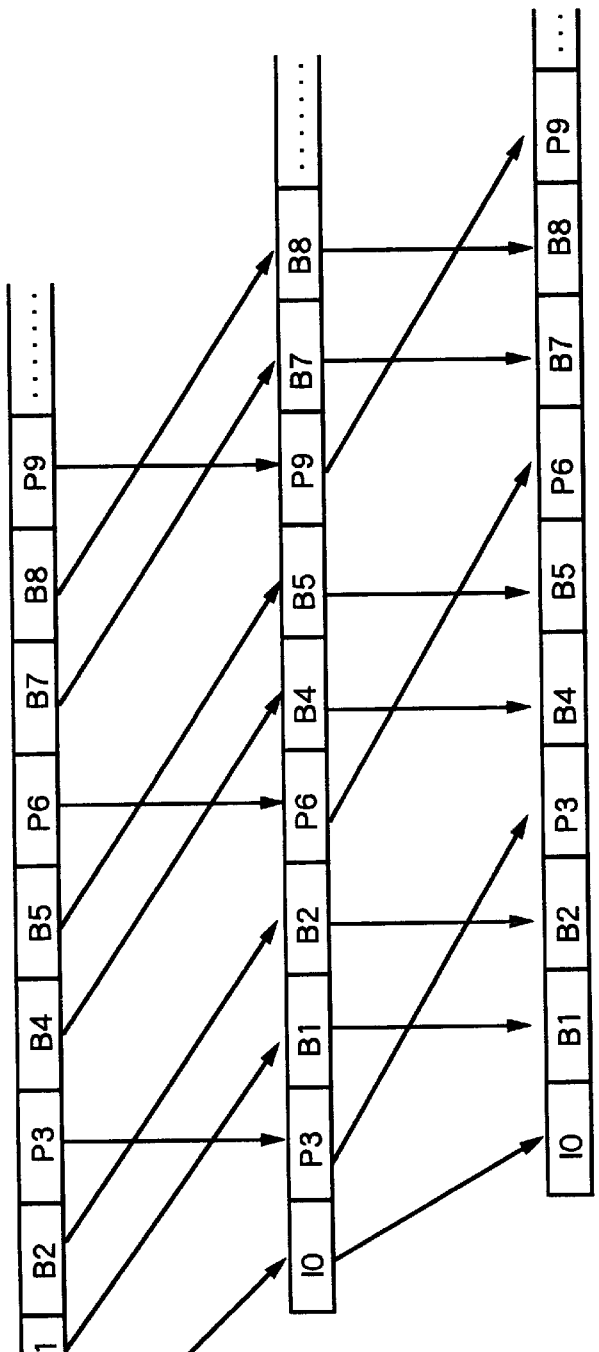

VIDEO AND AUDIO REPRODUCING DEVICE AND VIDEO DECODING DEVICE

This disclosure is a continuation-in-part of U.S. patent application Ser. No. 08/655,887, filed May 31, 1996 now U.S. Pat. No. 5,808,722.

BACKGROUND OF THE INVENTION

1. Field of the Invention

The present invention relates to a video and audio reproducing device. In particular, the present invention relates to a video and audio synchronization controller for decoding coded video and audio data and for synchronizing video data with audio data and a video decoding device in the video and audio reproducing device for preventing the video buffer memory from becoming empty (underflow) or full (overflow).

2. Description of the Prior Art

FIG. 19 shows a conventional video and audio reproducing device comprising a video and audio separator 2, an audio buffer memory 25, an audio decoder 30, a video buffer memory 45, a video and audio synchronization controller 4, and a video decoder 50. The video and audio separator 2 separates coded video and audio data 1 received via a circuit such as a satellite communication line or a CATV wire, or received from a storage medium (a package) such as a CD-ROM and a DVD, video data, audio data, video time stamp (V-TS), and audio time stamp (A-TS), respectively. The audio buffer memory 25 stores and delays the separated audio data as well as the audio time stamps. The audio decoder 30 starts decoding in response to an audio decoding start controlling signal 32 from the video and audio synchronization controller 4. The video buffer memory 45 stores and delays the separated video data as well as video time stamps. The video and audio synchronization controller 4 generates an audio decoding start controlling signal 32 and a video decoding start controlling signal 52 using a video time stamp 49, an audio time stamp 29, and a system clock reference (SCR) 3. The video decoder 50 starts decoding in response to the video decoding start controlling signal 52 output from the video and audio synchronization controller 4.

The operation of the conventional video and audio reproducing device is explained below. The device of FIG. 19 is used for a receiver for the video and audio communication media or a reproducing means for a storage medium such as a CD-ROM and a DVD. The video and audio separator 2 receives the coded video and audio data 1 from a communication line or a storage medium, and separates the coded video and audio data 1 into coded audio data 21, a coded audio time stamp 22, coded video data 41, and a coded video time stamp 42.

Then, the video buffer memory 45 delays the coded video time stamp 42, and outputs it to the video and audio synchronization controller 4 as a video time stamp (V-TS) 49. The video buffer memory 45 delays the coded video data 41, and outputs it to the video decoder 50 as delayed coded video data 48.

The audio buffer memory 25 delays the audio time stamp 22, and outputs it to the video and audio synchronization controller 4 as a delayed time stamp (A-PTS) 29. The buffer memory 25 also delays the coded audio data 21, and outputs them to the audio decoder 30 as coded audio data 28.

The video and audio synchronization controller 4 generates the audio decoding start controlling signal 32 using the audio time stamp 29 and the system clock reference (SCR) 3, and also generates the video decoding start controlling signal 52 using the video time stamp 49 and the system clock reference (SCR) 3. Activated by the audio decoding start controlling signal 32, the audio decoder 30 starts decoding the coded audio data 28 and outputs the audio output 31. The video decoder 50 starts decoding the delayed coded video data 48 activated by the video decoding start controlling signal 52, and outputs the video display signal 51.

In this manner, it is possible to synchronize the audio signal 31 and the video display signal 51 using the audio decoding start controlling signal 32 and the video decoding start controlling signal 52. The synchronization of the audio and the video is explained below.

FIG. 20 shows a video and audio synchronization controller 4 according to the conventional art. The video and audio synchronization controller 4 of FIG. 20 comprises a system time counter 101 for outputting a system time clock (STC) 102, an audio synchronization comparator 103, and a video synchronization comparator 109. The system time counter 101 sets the time using the system clock reference (SCR) 3 which is separated by the video and audio separator 2. The audio synchronization comparator 103 outputs the audio decoding start controlling signal 32 when the system time clock (STC) 102 matches with the delayed audio output time stamp (A-PTS) 29. The video synchronization comparator 109 outputs the video decoding start controlling signal 52 when the system time clock (STC) 102 matches with the delayed video time stamp (V-TS). The system clock reference (SCR) 3 is included in the header of the bit stream, and this system clock reference (SCR) 3 is used as a reference for determining the absolute time of the entire system. This system clock reference (SCR) is inserted into the header of the bit stream at a transmission station which transmits the video signal, or at a recorder where the video is recorded on the package. After setting the time using the system clock reference (SCR) 3, the system time counter 101 counts the system time clock (STC) 102. This STC 102 is used as a reference clock for generating the audio output 31 and the video display signal 51 output from the audio decoder 30 and the video decoder 50, respectively.

FIG. 21A–FIG. 21G are timing charts explaining the operation of the conventional video and audio reproducing device. In FIG. 21A, the coded video and audio data 1 contain video and audio data. The header of each video data frame includes system clock reference (SCR) 3, decoding time stamps (V-DTS), and video presentation time stamps (V-PTS). The header of each audio data frame includes system clock reference (SCR) 3 and audio presentation time stamps (A-PTS). Both V-DTS and V-PTS in the video data are referred to as a video time stamp (V-TS) or simply as a time stamp (TS) below. That is, when mentioning as "time stamp", both V-DTS and V-PTS are included in the "time stamp", unless specified. Pictures are displayed on a monitor (or display) using any one of V-DTS or V-PTS, depending on the type of a video frame to be displayed. The video presentation time stamp (V-PTS) indicates a time when the picture appears at the upper left corner of the monitor. The video decoding time stamp (V-DTS) indicates a time when the decoding of the video frame is started in the ideal decoder whose decoding time is zero. Assuming that time "T" is required for decoding the data in an actual decoder, the decoding should be started at a time V-DTS−T. That is, the decoding should be started earlier time "T" before the ideal time V-TDS, taking into consideration of the time required for the actual decoding process.

The audio signal does not include a decoding time stamp, but only the presentation time stamp (A-PTS). The audio presentation time stamp (A-PTS) indicates a time when the head of an audio frame is output.

After the absolute time is set using SCR, the system time clock (STC) starts counting the time under 90 kHz. FIG. 21B is a timing chart showing this STC count. In FIG. 21B, the horizontal scale represents the time indicted by STC count, which is counted up by 90 kHz clock. Immediately after the system has been powered on, the system time counter 101 is set to SCR count, which are included in the header of the respective frames of the input coded signal. For example, in FIG. 21B, the system time counter 101 is set to SCR count (=93994), which is included in the header of the I picture V(I0), which is the first arriving picture frame after the system has been powered on. Thereafter, the system time counter 101 counts up the system time clock. One frame time of the NTSC video is 33 ms, which corresponds to 3003 clocks. Therefore, as shown in FIG. 21B, the respective frame units equals to 3003 STC counts. The intermediate counts are omitted in FIG. 21B.

I pictures, P pictures, and B pictures are briefly explained below. The description regarding the concept of the I pictures, P pictures, and B pictures is found in Coding Of Moving Pictures And Associated Audio, ISO/IEC JTC1/SC29/WG11 N0803, which gives definitions as follows:

I-picture: inter-coded picture: A picture coded using information only from itself.

P-picture: predictive-coded picture: A picture that is coded using motion compensated prediction from past reference fields or frame.

B-picture: bidirectionally predictive-coded picture: A picture that is coded using motion compensated prediction from a past and/or future reference picture.

FIGS. 22A–22C illustrate the MPEG coding and decoding method according to the conventional art. FIG. 22A shows a frame order of the displayed original video. FIG. 22B shows a frame order of the coded video in the signal stream such as a video signal stream transmitted via communication line or a video signal stream recorded on a CD-ROM. FIG. 22C shows a frame order of the displayed video stream of FIG. 22B after decoded, such as a picture displayed on a monitor.

The operation of the conventional video and audio reproducing device is explained below. As explained above, I picture and P pictures are decoded and displayed on the monitor at the time when the subsequent I picture and P picture are being displayed. B pictures are decoded and displayed almost simultaneously. In other words, all the B pictures are decoded according to V-DTS and are displayed according to V-PTS. To take a closer look at the relationship between V-DTS and V-PTS included in the headers illustrated in FIG. 21A, V-PTS count indicates a time when I picture and P pictures will be displayed next. For example, the V-PTS count in the I picture V(I0) is 103003, which is equal to V-DTS count in the subsequent P picture V(P3). The V-PTS count in the P picture V(P3) is 112012, and this count is equal to V-DTS count in the subsequent P picture V(P6). On the contrary, in the B pictures, V-PTS count and V-DTS count are equal. For example, the V-PT count in the B picture V(B1) is 106006, and this equals to the V-DTS count.

Explaining this in more detail, since V-DTS count included in the header of the frame of the I picture V(I0) is 100000 and the count of V-PTS is 103003, the decoding of the I picture V(I0) ideally starts when STC counts is 100000 (=V-DTS), as shown in FIG. 21C, and the decoded video is ideally displayed when STC counts is 103003 (=V-PTS), that is, when the decoding of the subsequent P picture (P3) begins (=103003). Since these are ideal decoding time and display time and they are different from the actual time, they are represented as dotted lines in the charts.

Since V-DTS count contained in the header of the frame of the P picture V(P3) is 103003 and V-PTS count is 112012, the decoding of the P picture V(P3) ideally starts when STC counts 103003 (=V-DTS) as shown in dotted line in FIG. 21C, and the display of the P picture V(P3) is ideally displayed when STC counts 112012 (=V-PTS), that is, when the decoding of the subsequent P picture (P6) begins (=112012). Since V-DTS count included in the header of the subsequent B picture (B1) is 106006, and V-PTS count is also 106006, the decoding of the B picture V(B1) ideally starts when STC counts 106006 (=V-DTS) as shown in dotted line in FIG. 21C. The B picture V(B1) is displayed simultaneously with the decoding time when STC counts is 106006 as shown in FIG. 21D.

Since the A-PTS count in the header of the audio signal A0 in the second frame in FIG. 21A is 104500, the audio is output when STC count is 104500. In this way, there is no concept of decoding time stamp (DTS) for the audio, and all audios are processed according to the presentation time stamp (PTS).

As explained above, when I picture (I0), B picture (B1), B picture (B2), P picture (P3) . . . are displayed at the counts 103003, 106006, 109009, 112012 . . . and the audios A0, A2 . . . are output at the counts 104500, 110506 . . . , the video and the audio are perfectly synchronized, and it solves the problem that the movement of one's mouth displayed in the monitor does not match with the voice.

However, since the picture is actually displayed synchronously with a frame pulse of the display system as shown in FIG. 21F, the picture is displayed at a different time from the ideal display frame time illustrated in FIG. 21D. The video synchronization comparator 109 compares the system time clock (STC) 102 and the delayed coded video time stamp (V-PTS) 49, and outputs the video decoding start controlling signal 52 and displays the video frame synchronously with the frame pulse of the display system closest to the time when STC=PTS is satisfied. Therefore, the time when the picture actually displayed on the monitor shifts ½ frames at the maximum than the ideal frame display time, that is, the picture is actually displayed on the monitor synchronously with the actual display frame of the display system and as shown in FIG. 21G.

In this occasion, the audio is output synchronously with the STC illustrated in FIG. 21B, and the video is displayed synchronously with the clock of the display system which is shown in FIG. 21F. Therefore, at the maximum, the display of the video shifts by ½ video frame from STC as shown in FIG. 21G. This causes the display of the video to shift by ½ video frame at the maximum from the output of the audio. In this manner, problems occur such that the movement of one's mouth on the display does not match with the voice.

SUMMARY OF THE INVENTION

It is an object of the present invention to obtain a video and audio reproducing device for perfectly matching the video with the audio without any delay between them. In particular, for the communication media use, it is an object of the present invention to obtain a video and audio reproducing device for perfectly matching the video with the audio, and for minimizing the time lag at the receiving station and the transmitting station.

According to an aspect of the invention, a video and audio reproducing device includes a video and audio synchronization controller which sets a system clock reference (SCR)

included in the frame header portion of the coded video and audio data into a system time counter to set a timing of a system time clock (STC), immediately after the video and audio reproducing device has been powered on. The video and audio reproducing device decodes and displays a first arriving video data synchronous with a display system frame pulse, which is the closest to the value of a video time stamp included in a frame header of the first video frame on the time axis of the set STC. The video and audio synchronization controller sets again the value of the time stamp included in the first video frame to the system time counter to update the STC. The video and audio reproducing device outputs the video data for the second and subsequent video frames and all the audio data synchronously with the updated STC by outputting the video and audio data when the time indicated by the video and audio time stamps arrives on the time axis of the updated STC.

According to another aspect of the invention, a video and audio reproducing device includes a video and audio synchronization controller which decodes and displays a first arriving video frame immediately after the video and audio reproducing device has been powered on, regardless of the time stamp included in a header of the first arriving video frame and sets a time stamp included in the first arriving video frame to the system time counter while the first arriving video frame is displayed to set a timing of a system time clock (STC). The video and audio reproducing device outputs the video data for the second and subsequent video frames and all the audio data synchronously with the set STC by outputting the video and audio data when the time indicated by the video and audio time stamps arrives on the time axis of the set STC.

According to a further aspect of the invention, a video and audio reproducing device, on the video processing side, stores the separated video time stamps in the video time stamp memory, compares a write address used for writing the coded video data to the video buffer memory with a read address used for reading an address at a video frame address comparator, reads and latches a head time stamp stored in the video time stamp memory, when the write address matches with the read address, supplies the latched time stamp to the video and audio synchronization controller as a video time stamp. On the audio processing side, the video and audio reproducing device stores the separated audio time stamps in the audio time stamp memory, compares a write address used for writing the coded audio data to the audio buffer memory with a read address used for reading an address temporarily stored in the audio buffer memory at an audio frame address comparator, reads and latches a head time stamp stored in the audio time stamp memory, when the write address matches with the read address and supplies the latched time stamp to the video and audio synchronization controller as an audio time stamp.

According to a still further aspect of the invention, a video and audio reproducing device, on the video processing side, stores the separated video time stamps in the video time stamp memory, compares a write video frame count used for writing the coded video data to the video buffer memory with a read video frame count of the read video frame at a video fame address comparator, reads and latches a head time stamp stored in the video time stamp memory, when the write video frame count matches with the read video frame count and supplies the latched time stamp to the video and audio synchronization controller as a video time stamp. On the audio processing side, the video and audio reproducing device stores the separated audio time stamps in the audio time stamp memory, compares a write audio frame count used for writing the coded audio data to the audio buffer memory with a read audio frame count of the read audio frame at an audio frame address comparator, reads and latches a head time stamp stored in the audio time stamp memory, when the write audio frame count matches with the read audio frame count, and supplies the latched time stamp to the video and audio synchronization controller as an audio time stamp.

According to a further aspect of the invention, a video and audio reproducing device, on the video processing side, latches the separated video time stamps in the video time stamp latch, compares a write video frame count used for writing the coded video data to the video buffer memory with a read video frame count of the read video frame at a video frame address comparator, reads a time stamp latched in the video time stamp latch, when the write video frame count matches with the read video frame count, and supplies the latched time stamp to the video and video synchronization controller as a video time stamp. On the audio processing side, the video and audio reproducing device latches the separated audio time stamps in the audio time stamp latch, compares a write audio frame count used for writing the coded audio data to the audio buffer memory with a read audio frame count of the read audio frame at an audio frame address comparator, reads a time stamp latched in the audio time stamp latch, when the write audio frame count matches with the read audio frame count, and supplies the latched time stamp to the video and audio synchronization controller as an audio time stamp.

According to a further aspect of the invention, a video decoder includes a vbv separator for separating a vbv delay included in a header of coded video data, and for obtaining a corresponding vbv storage capacity, a vbv hold judgement comparator for comparing the vbv storage capacity with a current actual video buffer memory capacity, for sending an ON hold signal when the actual video buffer memory capacity<vbv storage capacity, and for sending an OFF hold signal when the actual video buffer memory capacity≧vbv storage capacity, wherein said decoder holds the decoding when the ON hold signal is appeared regardless of the video decoding start controlling signal, and starts the decoding when the OFF hold signal is appeared.

According to a further aspect of the invention, a video decoder includes an almost full skip judgement comparator for comparing the predetermined almost full threshold value and the current actual video buffer memory capacity, wherein the almost full skip control signal is activated for skipping the next stage decoding when the actual buffer storage capacity is at least equal to the almost full threshold value, and non-activated for starting the next stage decoding according the decoding starting control signal when the actual buffer storage capacity is smaller than the almost full threshold value.

According to a further aspect of the invention, a video decoder includes a flip-flop to be set when there is no time stamp in the video frame, and to be reset when a first video time stamp arrives, wherein the decoding is controlled by the output signal from the vbv hold judgement comparator when the flip-flop is set, and the decoding is controlled by the video output starting control signal after the first video time stamp have arrived.

According to a still further aspect of the invention, a video decoder includes a first means for outputting the signal to recognize the first frame, a selector for selecting a predetermined offset level (A) for preventing the video signal from being held by decoding timing jitter when the output of the first means have recognized the first frame, and for selecting zero offset level after the output of the first means have once recognized the first frame, and an adder for adding the output of the selector and the vbv storage capacity output from the vbv separator, wherein the comparator compares the output of the adder with the actual video buffer memory capacity, for the first frame, the comparator outputs an ON hold signal when the actual video buffer memory capacity<output of the adder (=vbv storage capacity+A) is satisfied, and outputs an OFF hold signal when the actual video buffer memory capacity≧the output of the adder (=vbv storage capacity+A) is satisfied, for the second and subsequent frames, the comparator outputs an ON hold signal when the actual video buffer memory capacity<output of the adder (=vbv storage capacity) is satisfied, and outputs an OFF hold signal when the actual video buffer memory capacity≧the output of the adder (=vbv storage capacity) is satisfied.

BRIEF DESCRIPTION OF THE DRAWINGS

FIGS. 3A–3I are timing charts showing the video and audio data according to the second embodiment of the present invention.

FIGS. 5A and 5B are timing charts showing the operations of the video and audio reproducing device according to the first embodiment of the present invention.

FIGS. 7A–7B are timing charts showing the operations of the video and audio reproducing devices according to the third embodiment of the present invention.

FIGS. 9A–9B are timing charts showing the operations of the video and audio reproducing devices according to a fourth embodiment of the present invention.

FIGS. 11A–11B are timing charts showing the operations of the video and audio reproducing devices according to the fifth embodiment of the present invention.

FIGS. 21A–21G are timing charts of the video and audio data according to the prior art.

FIGS. 22A–22C show the conversion of coding and decoding video data according to MPEG2.

DETAILED DESCRIPTION OF THE PREFERRED EMBODIMENTS

Embodiment 1.

According to the first embodiment, a system time counter sets the count of system clock reference (SCR) immediately after the power-on of the system to start the timer of the system time clock (STC). Then, when a first video data in the video signal arrives, the first video data are decoded and displayed synchronously with the fame pulse of the display system closest to the time stamp included in the header of the video data on the STC time. At the same time, the system count is replaced by the count of the time stamp of the first video to update the count of STC. When the subsequent video and audio data arrives after then, the video and audio data are output according to the updated STC count when the video and audio time stamp included in the header of the video and audio frame are appeared. In this manner, the video data in the second and subsequent frames and all the audio data are output synchronously with the updated STC time count.

Figure 1:
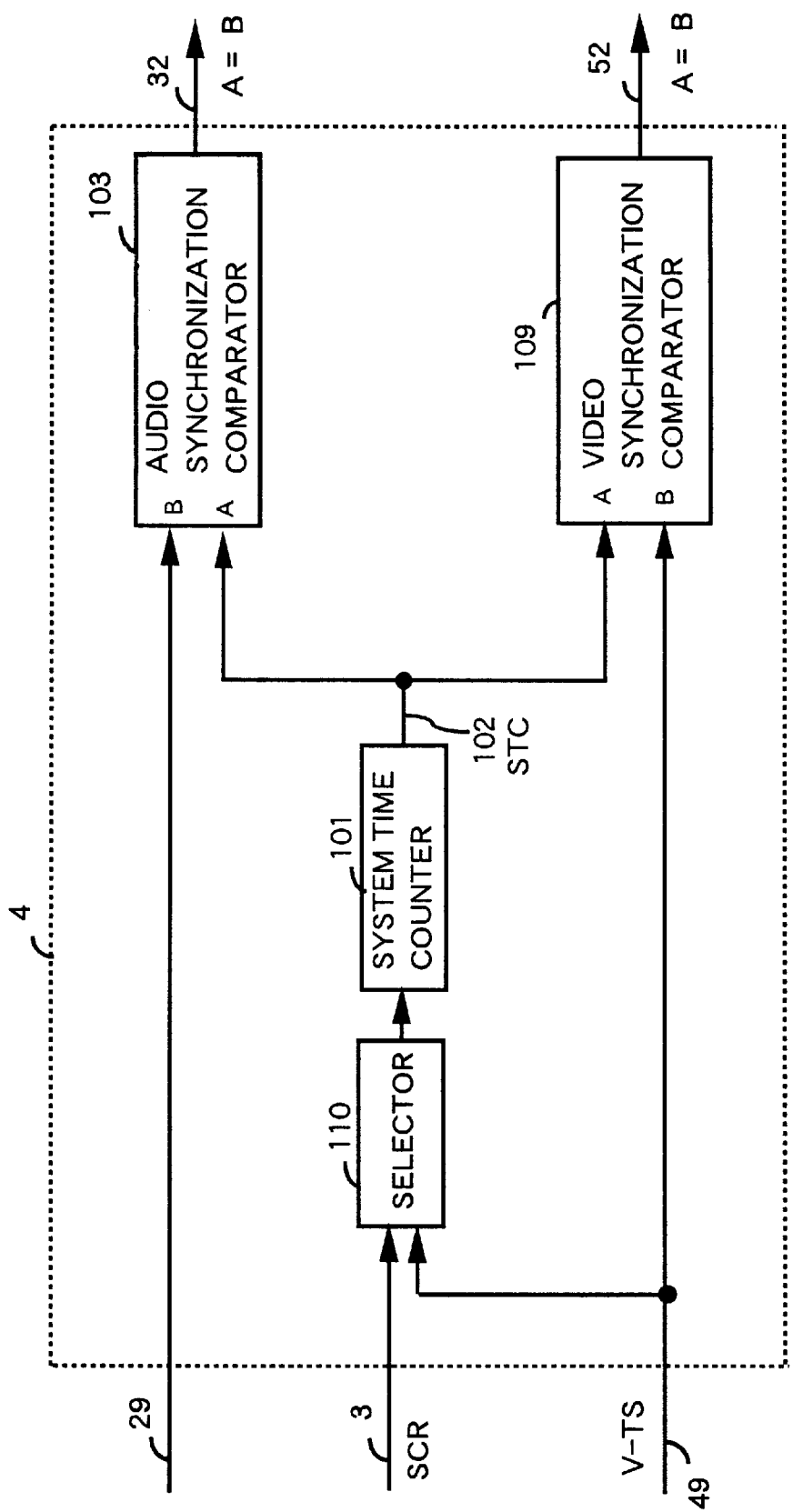
FIG. 1 shows a video and audio synchronization controller according to a first embodiment of the present invention.
Figure 4:
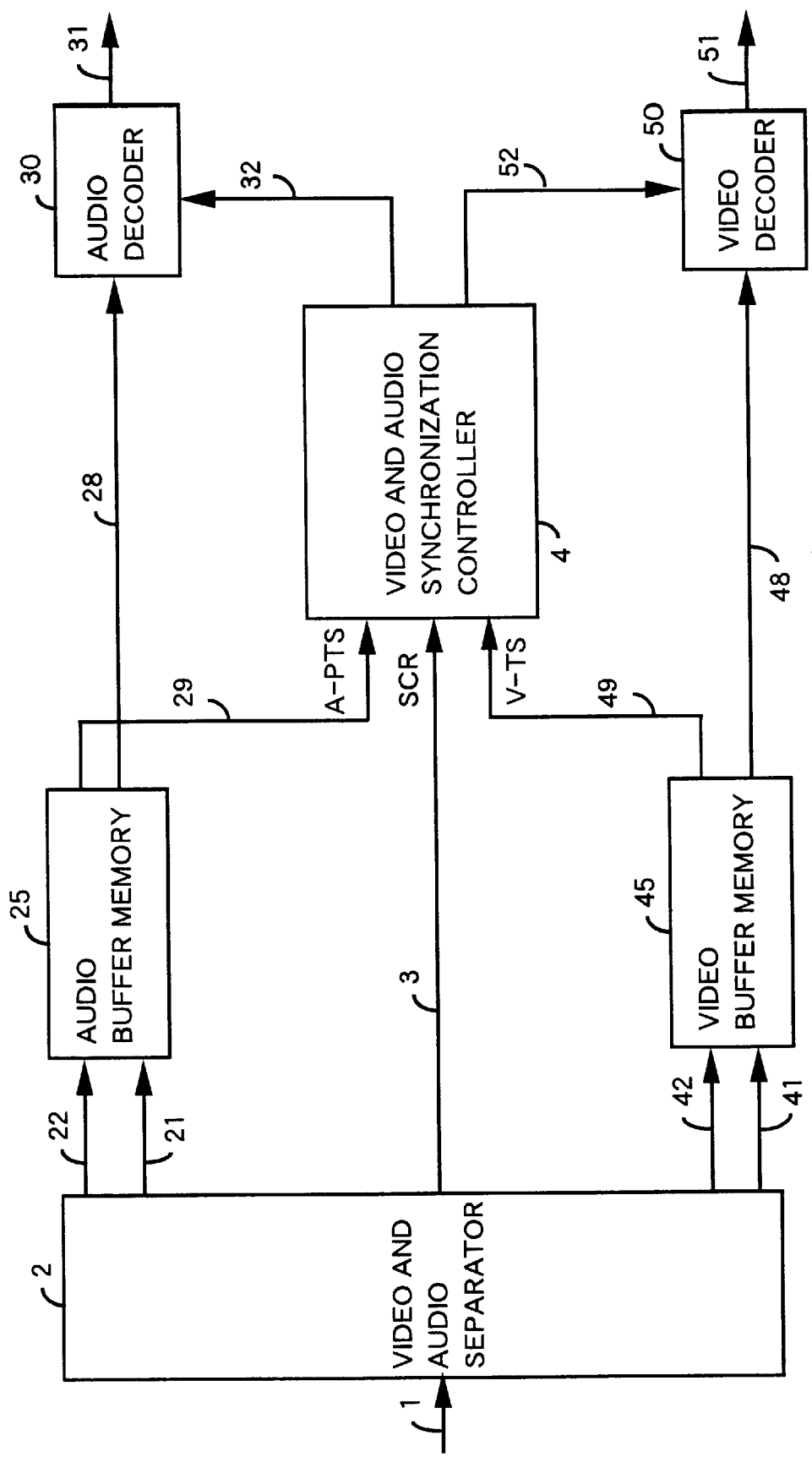
FIG. 4 shows a video and audio reproducing device according to the first embodiment of the present invention.
Figure 19:
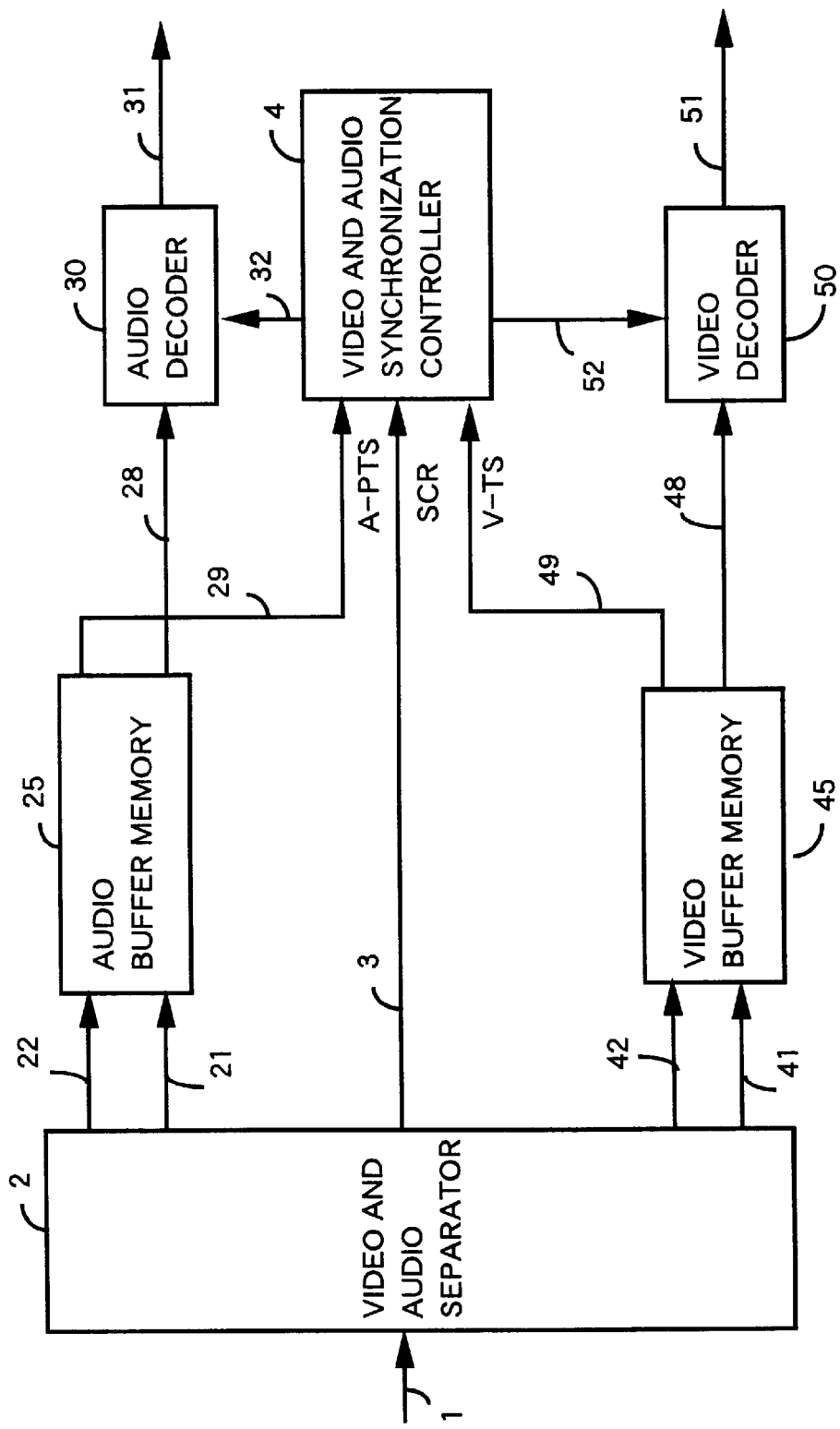
FIG. 19 shows a conventional video and audio reproducing device.
Figure 20:
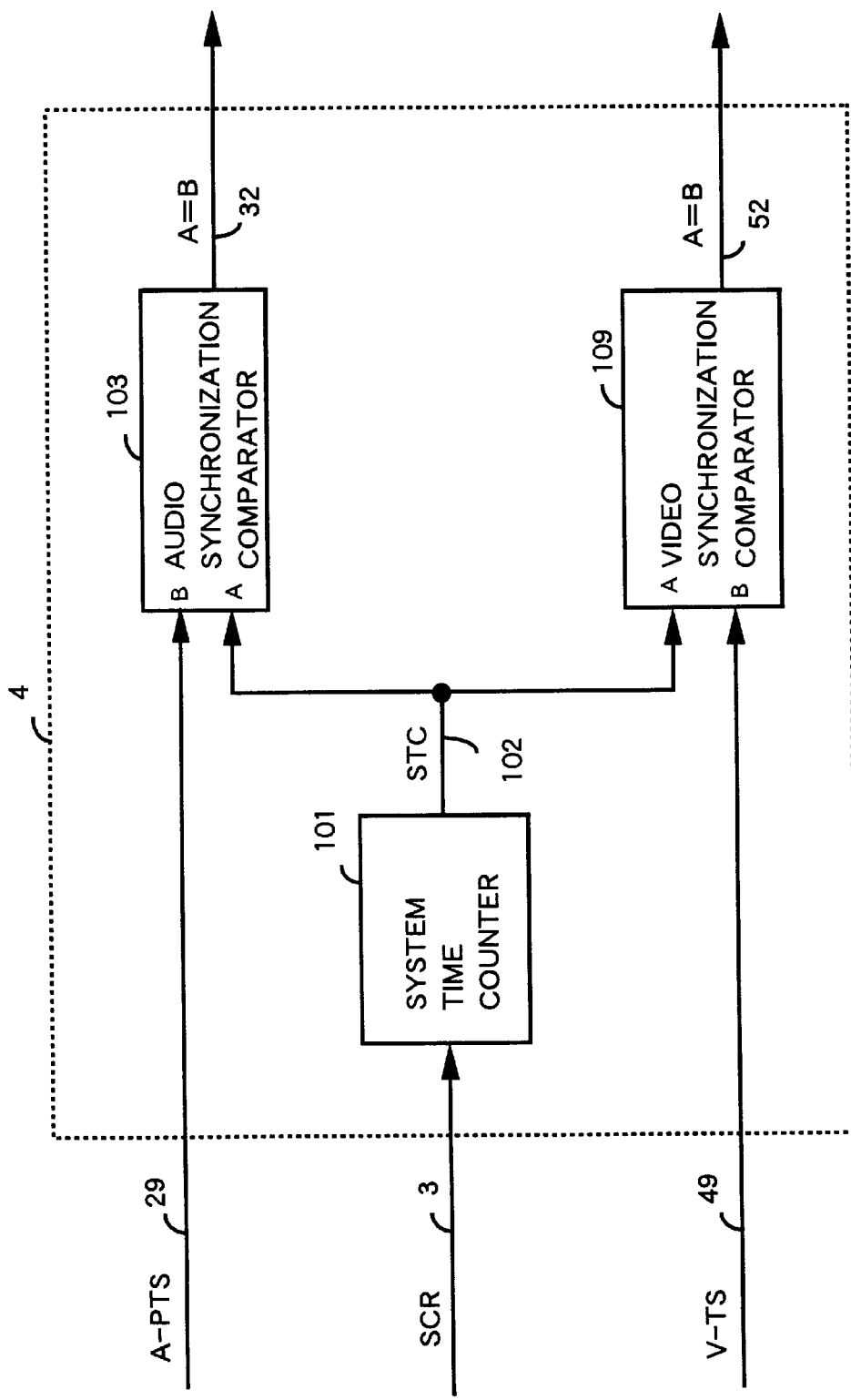
FIG. 20 shows a conventional video and audio synchronization controller.

FIG. 4 shows an entire video and audio reproducing device according to the first embodiment of the present invention. The video and audio reproducing device of FIG. 4 comprises a video and audio separator 2, a video and audio synchronization controller 4, an audio buffer memory 25, an audio decoder 30, a video buffer memory 45, and a video decoder 50. The overall construction of the video and audio reproducing device of FIG. 4 is the same as that of FIG. 19 except the video and audio controller 4. The specific feature of the invention according to the first embodiment is in that the video and audio controller 4 illustrated in FIG. 1 is used in place of the video and audio controller 4 illustrated in FIG. 4.

The overall operation of the video and audio reproducing device according to the first embodiment is explained below. The device of FIG. 4 is used as a receiver in video and audio communications on such as satellite or cable communication lines, and as a reproducing device in the video and audio storage media such as a CD-ROM or a DVD (Digital Video Disk). The video and audio separator 2 receives coded video and audio data 1 either via the communication line or from the storage medium in a storage media such as CD-ROM, and separates the coded data into a coded video data 41, a video time stamp 42, coded audio data 21, and a video time stamp 22.

The coded video data 41 and the video time stamp 42 are stored and delayed in the video buffer memory 45, and output to the video decoder 50 as delayed coded video data 48. The video and audio synchronization controller 4 receives the system clock reference (SCR) 3 and the delayed coded video time stamp (PTS) 49, and outputs a video decoding start controlling signal 52. Receiving the video decoding start controlling signal 52, the video decoder 50 decodes the delayed coded video data 48 and outputs a video display signal 51.

The coded audio data 21 and the audio time stamp 22 are stored and delayed in the audio buffer memory 25, and output to the audio decoder 30 as delayed coded video data 28. The video and audio synchronization controller 4 receives the system clock reference (SCR) 3 and the input of delayed coded audio time stamp 29, and outputs an audio decoding start controlling signal 32. Receiving the audio decoding start controlling signal 32, the audio decoder 30 decodes the delayed coded video data 28 and outputs an audio signal 31.

As explained above, the video and audio synchronization controller 4 utilizes the system clock reference (SCR) 3, the delayed coded audio time stamp 29, and the delayed coded video time stamp (V-TS) 49 to output the audio decoding start controlling signal 32 and the video decoding start controlling signal 52.

FIGS. 5A and 5B are respectively timing charts of the video signal process and of the audio signal process, according to the first embodiment. In FIG. 5A, in the video and audio data 1, the video packets and audio packets appear alternately in the predetermined ratio (in FIG. 5A, the ratio is 2:1). Each video packet has a frame header, and each of the frame header has a system clock reference (SCR), V-PTS (Video-Presentation Time Stamp), and V-DTS (Video-Decoding Time Stamp). Each audio packet also has a frame header, and each of frame header has a system clock reference (SCR) and A-PTS (Audio-Presentation Time Stamp).

In the video system, the coded video and audio data 1 is separated into the system clock reference (SCR) 3, the video time stamp 42, and the coded video data 41 by the video and audio separator 2. The system clock reference (SCR) is transmitted to the video and audio synchronization controller 4. The coded video data 41 and the video time stamp 42 are transmitted to the video buffer memory 45 and stored therein. After a predetermined time period, the coded video data 41 is delayed and transmitted to the video decoder 50 as delayed coded video data 48. After the predetermined time period, the video time stamp 42 is transmitted to the video and audio synchronization controller 4 as the delayed time stamp (V-TS) 49. The video and audio synchronization controller 4 generates the video decoding start controlling signal 52 based on the delayed video time stamp 49. In response to the video decoding start controlling signal 52, the video decoder 50 starts decoding of the delayed coded video data 48. In other words, the video decoder 50 starts decoding of the coded video data (I0, P3, B1 . . . ) in the delayed coded video data 48 when the time stamp V-DTS-T matches with the STC. The video data resulted from the decoding is displayed on a monitor. Since it takes a time T for the decoding data from the beginning to the end, the decoding is started earlier by time T than the time when STC matches with DTS.

In the audio system, the coded audio data 21 and the audio time stamp (A-PT) 22 separated in the video and audio separator 2, are stored in the audio buffer memory 25. The coded audio data 21 is delayed and output to decoder 30 as a delayed coded audio data 28. The decoder 30 decodes the delayed coded audio data 28. The audio time stamp 22 is delayed and output by the audio buffer memory 25 as a delayed audio time stamp 29. The video and audio synchronization controller 4 generates the audio decoding start controlling signal 32 based on the delayed audio time stamp 29. In response to the audio decoding start controlling signal 32, the audio decoder 30 starts to decode the delayed coded audio data 28. The coded audio data (A0, A1, . . . ) in the delayed coded audio data 28 are decoded and output as audio data when the A-PTS matched with the STC.

FIG. 1 shows the detailed construction of the video and audio synchronization controller 4 according to the first embodiment. FIGS. 2A–2I are timing charts showing the video and audio processings shown in FIG. 1. The synchronization controller 4 of FIG. 1 comprises a selector 110, a system time counter 101, an audio synchronization comparator 103, and a video synchronization comparator 109. The selector 110 selects either the system clock reference (SCR) 3 or the delayed video time stamp (V-TS) 49. The system time counter 101 sets the timing according to the output from the selector 110, counts the clocks, and generates and output the system time clock (STC) 102. The audio synchronization comparator 103 generates an audio decoding start controlling signal 32 from the delayed time stamp 29 and the system time clock (STC) 102. The video synchronization comparator 109 generates a video decoding start controlling signal 52 from the video time stamp (V-TS) 49 and the system time clock (STC) 102.

The video and audio synchronization controller 4 of the first embodiment is used when an absolute timing is necessary in displaying the video data. This invention would be very effective, for example, when the indication of the absolute time is desired on the monitor, in response to the coded video and audio signal transmitted via in the satellite communication line or the CATV line, or in response to the coded video and audio signal transmitted from the storage media (a package) such as CD-ROM or DVD.

Figure 2:
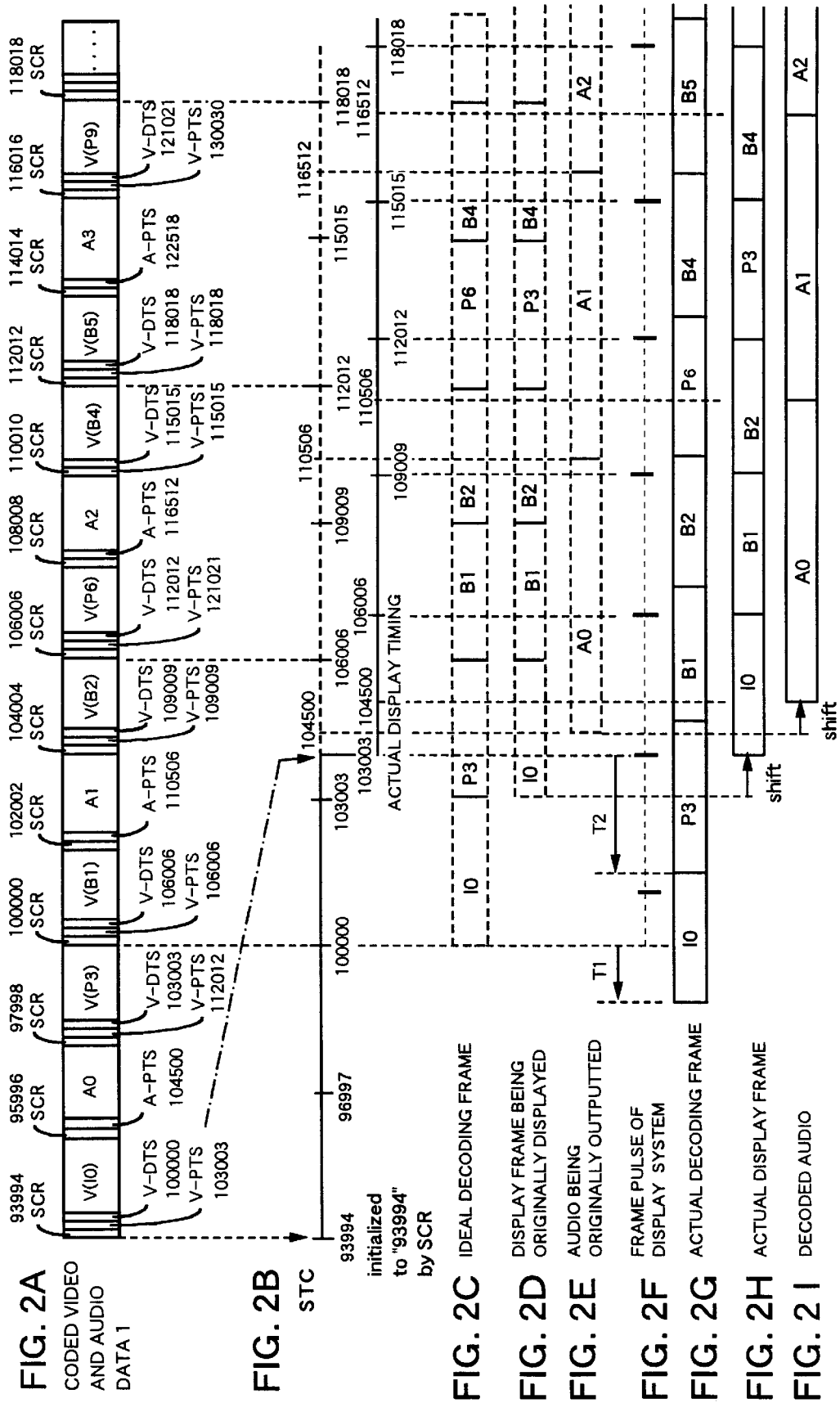
FIGS. 2A–2I are timing charts showing video and audio data according to the first embodiment of the present invention.

The operation of the invention according to the first embodiment is explained below using FIG. 1 and FIGS. 2A–2I. As shown in FIG. 2A, immediately after the video and audio reproducing device is powered on, the selector 110 selects the system clock reference (SCR) 3, and updates the system time counter 101 by the count of the system clock reference 3. The system clock reference (SCR) 3 is contained in the headers of the respective frames in the coded video and audio data 1, and is a reference clock transmitted from the transmitting terminal to provide the system with the absolute time periodically. After the update, the system time clock counter 101 counts up the updated system time clock (STC) 102 by 90 kHz clock. For example, in FIG. 2B, the system time counter 101 updates the system time clock (STC) 102 by setting to the count of the system clock reference (SCR) (=93994) which is included in the header of the video frame V(I0) immediately after the video and audio reproducing device has been powered on. The system time counter 101 counts up the system time clock (STC) 102 by 90 kHz clock. That is, the system time counter 101 counts up per 3003 for every NTSC video frame (33 ms: precisely 1.001/30 sec), as shown in FIG. 2B such as 96997, . . . 100000, . . . 103003, . . . 106006.

The system time clock (STC) is a clock for counting time by 90 kHz after the system time counter 101 has been updated to SCR count. As FIG. 2A shows, the coded audio and video data 1 includes the video frames whose respective header contains SCR, V-DTS, V-PTS, and the audio frames whose respective header contains SCR and A-PTS. As mentioned above, the video time stamp (V-TS) comprises the decoding time stamp (V-DTS) and the presentation time stamp (V-PTS). V-PTS is a signal for displaying the head of the video frame (upper left of the monitor) which contains the PTS, when STC=PTS. V-DTS is a signal for decoding the video frame including the V-DTS when STC=V-DTS, if assuming that the video decoding time is zero, and displaying the I picture and P picture after subsequent I picture and P picture are decoded, and displaying the B picture immediately after they are decoded. However, since it takes some period to decode the data, it is preferable to start decoding the B picture when STC=V-DTS−T, if assuming the time lag for decoding the B picture is T. On the other hand, the audio time stamp is defined only by A-PTS. The A-PTS is a signal for outputting the head of the audio frame which includes the A-PTS, when STC=A-PTS.

The process for decoding and displaying the video data is concretely explained below using FIGS. 2A–2I. As FIG. 2A shows, the video frame V(I0) is a frame received immediately after the video and audio reproducing device has been powered on. The count of V-DTS included in the video frame V (I0) is 100000, and the count of V-PTS is 103003. Assuming the decoder is ideal one in this example, when the SCR becomes to 100000 after being updated at 93994, the decoding of V(I0) is begun as illustrated in FIG. 2C. Similarly in the ideal decoder, when STC count becomes the time 103003, V(I0) should be started to display as shown in FIG. 2D. However, actually, the video synchronization comparator 109 compares the system time clock (STC) 102 and the delayed coded video time stamp (V-PTS) 49, and the video decoding start controlling signal 52 is synchronous with the display system frame pulse which is closest to the time STC=V-PTS as illustrated in FIG. 2H. In response to this output video decoding start controlling signal 52, the video decoder 50 outputs the display video signal 51. In the above example, a delay occurs between the display of the video and the output of the audio. Therefore, in order to prevent this delay, the STC is updated based on the video frame which has been actually displayed (when STC= 103003), and thereafter the audio signal is output when the updated STC matches with the A-PTS (when STC=104500, 110506, 1162512, . . . ). That is, the selector 110 updates the count of the system time counter 101 to the count of V-PTS (=103003) synchronously with the frame pulse, shown in FIG. 2F, which is closest to STC (=103003) where the first video frame 10 might be displayed in the ideal situation as shown upper time axis in FIG. 2B. This updated STC (indicated as "actual presentation frame" shown in the lower time axis in FIG. 2B) is also counted up by the 90 kHz clocks. This updated STC starts at 103003, and is counted up such as 106006, . . . 109009, . . . 112012, . . . and so on. Since the updated STC is used for the video and audio reproducing device, the video and audio data operate on the axis of this updated STC.

Since the STC is not updated when the first video frame appearers, the decoding of V(I0) is started as illustrated in FIG. 2G at the time (100000-T1) on the time axis of the firstly set STC (shown in the upper time axis in FIG. 2B. However, since STC (=103003) is shifted backward shown in the lower time axis in FIG. 2B, the next video data V(P3) is decoded based on the updated STC time axis, that is, at a time 103003−T2. Here, T1 and T2 are controlled to be ahead by an actual decoding time (=T1, T2) so that the decoding is sufficiently carried out in the hardware. V(P3) is displayed at the time 112012, which is indicated by V-PTS of the video frame V(P3), on the updated STC time axis.

As shown in FIG. 2G, the decoding of the subsequent V(B1) is started at the time 106006−T2, which corresponds to V-DTS−T2, on the updated time axis, and then displayed at the time V-PTS (=106006). Similarly, the decoding of the video data V(B2) is started at 109009−T2, which is indicated by V-DTS, on the updated time axis, and displayed at the time V-PTS (=109009).

Regarding the audio signal, the audio synchronization comparator 103 decodes and outputs the first audio frame A0 when the updated STC becomes the time (=104500), indicated by the delayed audio time stamp (A-PTS) 29, on the updated time axis, as illustrated in FIG. 2I.

As shown in FIGS. 2H and 2I, since the actual video display frame and the audio output are decoded and displayed synchronously with the frame pulse of the display system, the audio display is perfectly synchronized with the video display. Each of the actual video display frame and the audio frame are shifted for the same amount from the ideal video representation frame and ideal audio representation frame, respectively illustrated in FIGS. 2D and 2E. Therefore, the phase relationship of the video and the audio is perfectly synchronous. In other words, the movement of one's mouth displayed in the monitor matches with the voice.

As explained above, according to the first embodiment, when the video and audio reproducing device is powered on, the STC is updated by the SCR and the first video frame is decoded, and then the STC is updated by the V-PTS of the first data. Thereby, it is possible to perfectly synchronize the video data and the audio data with the clock of the display system, and also to perfectly synchronize the phases of the video and the audio. In other words, it is possible to match the movement of one's mouth on the display with the voice.

Embodiment 2.

The invention according to a second embodiment relates to a video and audio synchronization controller in a video and audio reproducing device used for a system in which the absolute time is not so significant, such as a reproducing system for reproducing the video and audio signal from the storage media such as CD-ROM or DVD. In other words, this invention is advantageous for a system which is not necessary to indicate the absolute time on the monitor when receiving a coded video and audio signal transmitted from the storage media (a package) such as CD-ROM and VDD. In this case, it is possible to eliminate the selector 110 from the video and audio synchronization controller 4 according to the first embodiment.

Figure 3:
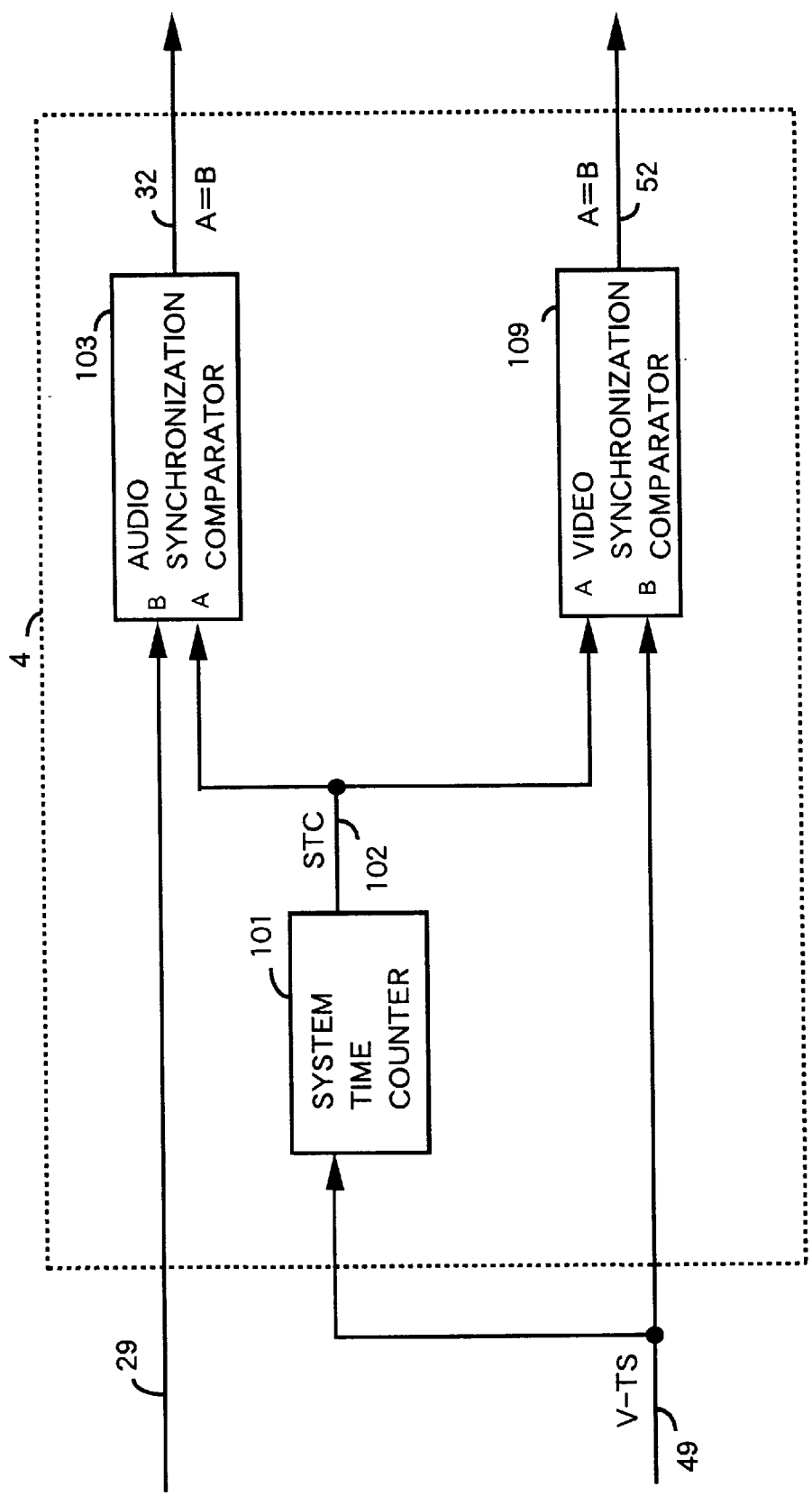
FIG. 3 shows a video and audio synchronization controller according to a second embodiment of the present invention.

FIG. 3 shows details of the video and audio synchronization controller 4 according to the second embodiment of the present invention. FIGS. 3A–3I are timing charts illustrating the video and audio decoding processes performed in the circuit of FIG. 3. The video and audio synchronization controller 4 of FIG. 3, which is used for the video and audio reproducing device of the second embodiment, comprises a system time counter 101, an audio synchronization comparator 103, and a video synchronization comparator 109. The system time counter 101 sets the timing in response to the delayed time stamp (V-TS) 49, counts the clocks, and generates and outputs the system time clock (STC) 102. The audio synchronization comparator 103 generates an audio output start controlling signal 32 in response to the delayed audio time stamp 29 and the system time clock (STC) 102. The video synchronization comparator 109 generates a video output start controlling signal 52 in response to the delayed video time stamp 49 and the system time clock (STC) 102.

In the video and audio synchronization controller 4 according to the second embodiment of the present invention, the video frame V(I0), arrived immediately after the video and audio reproducing device is powered on, is decoded regardless of the time stamp V-DTS included in the frame header. When the first video frame is displayed, the count STC of the system time counter is updated to the count of the time stamp V-PTS, which is included in the first video frame. When the counts of the video and audio time stamps included in the frame headers of the respective video and audio frames becomes equal to the time counts on the updated STC time axis, the video and audio data are output. In this manner, the second and subsequent video frames, and all the audio frames can be output synchronously with the updated STC.

The operation of the video and audio synchronization controller 4 according to the second embodiment is concretely explained using FIGS. 3A–3I. In the prior art and the first embodiment, when the first video frame V(I0) arrives immediately after the video and audio reproducing device has been powered on, the system time clock STC (102) is updated to SCR included in the header of the first video frame V(I0), and the system time counter 101 counts up the system time clock (STC) 102 by 90 kHz clock. On the contrary, in the second embodiment, when the first video frame V(I0) arrives, the system time counter 101 does not set the SCR (=93994) included in the first video frame V(I0) to the system time clock (STC) 102, but the first video frame V(I0) STC is decoded and displayed without being controlled by the time stamp. Then, when the first video frame V(I0) STC is displayed, the V-PTS count (=103003) included in the header of the first video frame V(I0) is set to the system time counter 101 to run the new STC. After then, all subsequent processes are determined based on this STC timing.

Before the system time clock (STC) 102 is set, the STC does not count the timing, thus the timing is indefinite. Therefore, the decoding of the first video frame V(I0) is started immediately after the video and audio synchronization controller 4 receives this first video frame V(I0), and the first frame V(I0) is displayed synchronously with the subsequent frame pulse of the display system (FIG. 3G). The displaying process of the first video frame V(I0) is explained in detail using FIG. 3D. When the video and audio synchronization controller 4 has completed receiving all the input of the first video frame V(I0), the decoding of the first video frame V(I0) begins. Since the first video frame V(I0) must be displayed synchronously with the video system frame pulse (FIG. 3G, 33 ms period for NTSC), the first video frame V(I0) is displayed synchronously with the immediately subsequent frame pulse available. In the second embodiment, the STC is set to V-PTS (=103003) at the immediately subsequent frame pulse available as shown in FIG. 3C.

After the above-described STC is set, the STC is counted up by 90 kHz clock of the display system, that is, the STC count is added by 3003 for every frame (33 ms) such as 103003, . . . 106006, . . . 109009, . . . 112012, . . . and so on.

As illustrated in FIG. 3H, soon after STC has been set, the first video frame V(I0) is displayed at V-PTS (=103003). On the other hand, since the V-DTS count of the video frame V(P3) is 103003, the decoding of the video frame V(P3) is started as shown in FIG. 3D (The decoding is controlled to begin earlier as much as the actual decoding time T). Since V-PTS count included in the header of the video frame V(P3) is 112012, this video frame V(P3) is displayed when STC count is 112012 as shown in FIG. 3H. The subsequent video frames are respectively decoded and displayed on the timing of STC shown in FIG. 3C, in the same manner explained above.

Alternatively, the audio frames are coded and displayed in the same manner explained above. For example, since the A-PTS count of the audio frame A0 is 104500, the audio frame A0 is coded and displayed when STC count is 104500.

As shown in FIGS. 3H and 3I, the actual video display frame and the audio output are perfectly synchronized, since they both are always coded and displayed on the STC which is synchronized with the frame pulse of the display system. The phase of the actual video display fame and that of the audio output are also perfectly synchronized, since their ideal display time and output time are respectively shifted by the same time period, as illustrated in FIGS. 3E and 3F.

As explained above, according to the second embodiment, after receiving the first video frame V(I0), since the STC is set to a time count V-PTS included in the header of the first video frame V(I0), the video data and the audio data are perfectly synchronized with the clock of the display system, and the phases of the video and the audio perfectly synchronized. Therefore, the movement of one's mouth displayed on a monitor can be matched with the voice.

Embodiment 3.

Figure 6:
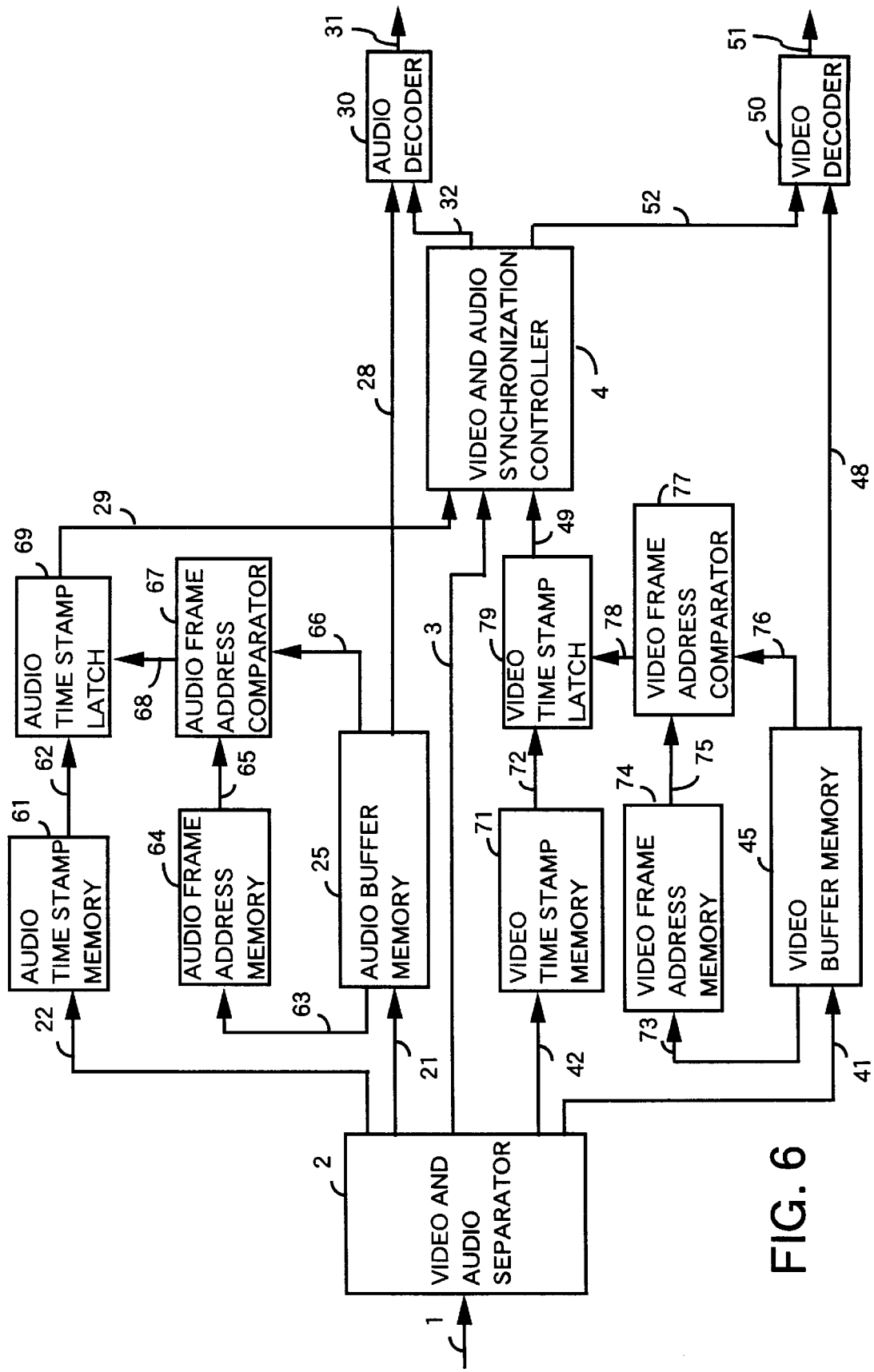
FIG. 6 shows a video and audio reproducing device according to a third embodiment of the present invention.

FIG. 6 shows a video and audio reproducing device for generating the delayed audio time stamp (A-PTS) 29 and the delayed video time stamp (V-TS) 49. The video side circuit of FIG. 6 comprises a video buffer memory 45, a video time stamp memory 71, a video frame address memory 74, video frame address comparator 77, and a video time stamp latch 79. The audio side circuit comprises an audio buffer memory 25, an audio fame address memory 64, an audio frame address comparator 67, an audio time stamp memory 61, and an audio time stamp latch 69. The same reference numbers in FIG. 6 are the same elements or devices as those in FIG. 4, so the detailed explanation is omitted.

FIG. 7A explains the video processing operation in the circuit of FIG. 6. In processing the video, the video time stamp memory 71 stores and delays the video time stamp which has been separated by the video and audio separator 2. The coded video data 41 separated by the video and audio separator 2 are sequentially written into the video buffer memory 45. A write address pointer 43 extracts head addresses 73 in the frames from the coded video data 41 and stores the extracted head addresses 73 in the video frame address memory 74 such as Ad(I0), Ad(P3), Ad(B1) . . . . A read address pointer 47 extracts head addresses of the video frames stored in the video buffer memory 45, and transmits the extracted head addresses to the video frame address comparator 77. When the content of the read address pointer is equal to the address stored in the video frame address memory 74, the video frame address comparator 77 sends out a video time stamp latch signal 78 to the video time stamp latch 79. In response to the video time stamp latch signal 78, the video time stamp latch 79 reads out the video time stamps (V-DTS and V-PTS) stored in the head of the video time stamp memory 71, and transmits it to the video and audio synchronization controller 4 as a delayed time stamp 49.

The concrete process for generating the delayed video time stamp 49 is explained below using FIG. 7A. When the coded video and audio data 1 shown in FIG. 7A are input to the video and audio reproducing device, the video time stamps (V-DTS and V-PTS) in the header of the first video frame V(I0) are separated by the video and audio separator 2. The separated video time stamps 42 are stored in the video time stamp memory 71, and are output in the order of first in first out. That is, the video time stamps 42 is written into the video time stamp memory 71 in the order such as (V-DTS(I0) and V-PTS(I0)), (V-DTS(P3) and V-PTS(P3)), (V-DTS(B1) and V-PTS(B1)) . . . .

Alternatively, the coded video data in the first video frame V(I0) is separated by the video and audio separator 2. The separated coded video data 41 is written into the video buffer memory 45 in the order of I0, P3, B1, . . . The write address pointer 43 extracts the respective head addresses Ad(I0), Ad(P3), Ad(B1), . . . out of the coded video data I0, P3, B1, . . . included in the coded video data 45, respectively, and the extracted head addresses are written into the video frame address memory 74 in the order of Ad(I0), Ad(P3), Ad(B1), . . . .

The video data 41 stored in the video buffer memory 45 are read in the order of I0, P3, B1, . . . and are sequentially transmitted to the video decoder 50. At this time, the read address pointer 47 reads the head addresses of the video data I0, P3, B1 in the order of Ad(I0), Ad(P3), Ad(B1), . . . .

The address Ad(I0) extracted in the read address pointer 47 is transmitted to the video frame address comparator 77. The video frame address comparator 77 compares the address Ad(I0) extracted in the read address pointer 47 with the address Ad(I0) stored in the head of the video frame address memory 74. When the address Ad(I0) extracted by the read address pointer 47 matches with the Ad(I0) stored in the head of the video frame address memory 74, the head video time stamps (V-DTS(I0) and V-PTS(I0)), which correspond to the head address Ad(I0) in the video frame address memory 74, are transmitted from the video time stamp memory 71 to the video time stamp latch 79. The transmitted head video time stamps are latched in the video time stamp latch 79, and transmitted to the video and audio synchronization controller 4 as a delayed video time stamp memory 49. After the head address Ad(I0) and the head video time stamps (V-DTS(I0) and V-PTS(I0)) are read from the video frame address memory 74 and the video time stamp memory 71, respectively, the subsequent address Ad(P3) and the video time stamp (V-DTS(P3) and V-PTS (P3)) are pushed forward and placed at the head position.

The address Ad(P3) extracted in the read address pointer 47 is transmitted to the video frame address comparator 77, as shown in the dotted line in FIG. 7A. The video frame address comparator 77 compares the address Ad(P3) extracted in the read address pointer 47 with the address Ad(P3) stored in the head of the video frame address memory 74. When the address Ad(P3) extracted by the read address pointer 47 matches with the address Ad(P3) stored in the head of the video frame address memory 74, the head video time stamps (V-DTS(P3) and V-PTS(P3)), which correspond to the top address Ad(P3) stored in the video frame address memory 74, are transmitted to the video time stamp latch 79. The head video time stamps V-DTS(P3) and V-PTS(P3) are latched in the video time stamp latch 79, and transmitted to the video and audio synchronization controller 4 as a delayed video time stamp 49.

In this manner, the delayed video time stamps in the sequence of (V-DTS(I0) and V-PTS(I0)), (V-DTS(P3) and V-PTS(P3)), (V-DTS(B1) and V-PTS(B1)) . . . and the coded video data in the sequence of I0, P3, and B1 . . . are transmitted to the video and audio synchronization controller 4.

The video and audio synchronization controller 4 generates the video output start controlling signal 52 based on the delayed video time stamps 49 and the system clock reference (SCR) 3. The video output start controlling signal starts decoding the delayed coded video data 4 in the video decoder 50 to output the video display signal 51.

FIG. 7B explains the audio processing operation in the circuit of FIG. 6. FIG. 7B is different from FIG. 7A in that the input signals are coded audio data 21 and audio time stamp 22 instead of coded video data 41 and the video time stamp 42, and the output signals are delayed coded audio data 28 and delayed audio time stamp 29 instead of the delayed coded video data 48 and the delayed audio time stamp 49. In the audio processing, the audio time stamp 22 separated by the video and audio separator 2 is stored and delayed in the audio time stamp memory 61. The coded audio data 21 separated by the video and audio separator 2 are sequentially written into the audio buffer memory 25. The write address pointer 23 extracts the head addresses of the audio frames from the coded audio data 21, and the extracted head addresses are stored in the audio frame address memory 64. The read address pointer 27 extracts the head addresses of the audio frames stored in the audio buffer memory 25, and transmits the extracted head addresses to the audio frame address comparator 67. When the content of the read address pointer 27 equals to the content of the audio frame address memory 64, the audio frame address comparator 67 outputs the audio time stamp latch signal 68 to the audio stamp latch 69. In response to the audio stamp latch signal 68, the audio stamp latch 69 reads out the audio time stamp (A-PTS) stored in the head of the audio time stamp memory 61, and transmits the audio time stamp to the video and audio synchronization controller 4 as a delayed audio time stamp 29.

More concrete explanation is omitted, since the operation shown in FIG. 7B is the same as that shown in FIG. 7A, except that the data stored in the audio time stamp memory 61 are A-PTS(A0), A-PTS(A1), A-PTS(A2) . . . , and that the data stored in the audio frame address memory 64 are Ad(A1), Ad(A2), Ad(A3), . . . .

In this manner, the delayed audio time stamps A-PTS (A0), A-PTS(A1), A-PTS(A2) . . . and the delayed coded audio data Ad(A1), Ad(A2), Ad(A3) . . . are transmitted to the video and audio synchronization controller 4.

Based on the delayed time stamp 29 and the delayed coded audio data 28, the video and audio synchronization controller 4 generates the audio output start controlling signal 32. The audio decoder 30 decodes the delayed coded audio data 28 based on the audio output start controlling signal 32, and outputs the audio signal 31.

Embodiment 4.

Figure 8:
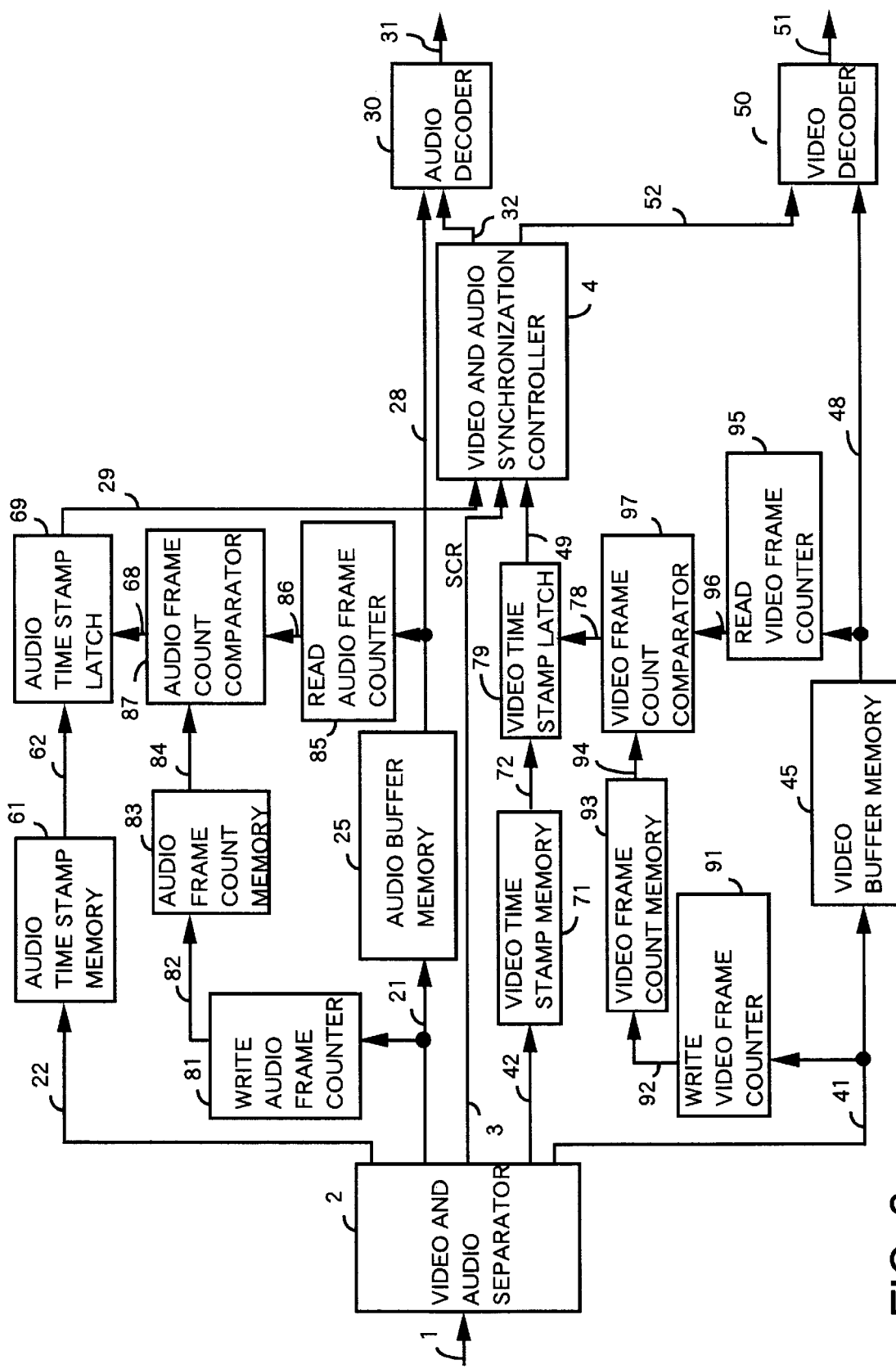
FIG. 8 shows a video and audio reproducing device according to a fourth embodiment of the present invention.

FIG. 8 shows a circuit for generating a delayed audio time stamp (A-PTS) 29 and a delayed video time stamp (V-PTS) 49 in the invention according to a fourth embodiment. The circuit of the fourth embodiment is different from that of the third embodiment in that frame counts are used instead of the frame addresses, and that the circuit of the fourth embodiment includes a write audio frame counter 81, a read audio frame counter 85, a write video frame counter 91, and a read video frame counter 95, instead of the write address pointer 23, the read address pointer 27, the write address pointer 43, and the read address pointer 47, respectively.

The video processing side of the circuit of FIG. 8 comprises a video buffer memory 45, a video time stamp memory 71, the write video frame counter 91, a video frame counter memory 93, the read video frame counter 95, a video frame count comparator 97, and a video time stamp latch 79. The audio processing side comprises an audio buffer memory 25, an audio time stamp memory 61, a write audio frame counter 81, an audio frame counter memory 83, a read audio frame counter 85, an audio frame count comparator 87, and an audio time stamp latch 96. The elements or devices having same reference numbers in FIG. 8 as those in FIG. 4 are the same elements or devices. Therefore, their detailed explanation is omitted.

FIG. 9A explains the video processing operation of the circuit of FIG. 8. The video time stamp 42 is separated by the video and audio separator 2, and stored and delayed in the video time stamp memory 71. The coded video data 41, which has been also separated by the video and audio separator 2, are sequentially written into the video buffer memory 45. The write video frame counter 91 extracts the frame counts 92 of the respective video frames from the coded video data 41, and stores the extracted frame counts 92 in the video frame counter memory 93. The read video frame counter 95 extracts the head frame counts 96 of the respective video frames stored in the video buffer memory 45, and transmits the extracted head frame counts 96 to the video frame count comparator 97. The video frame count comparator 97 compares the head frame counts 96, which has been transmitted from the read video frame counter 95, with the frame count, which is stored in the frame counter memory 93. If they are equal, the video frame count comparator 97 outputs a video time stamp latch signal 78 to the video time stamp latch 79. In response to the video time stamp latch signal 78, the video time stamp latch 79 reads the video time stamps (V-DTS and V-PTS) stored in the head of the video time stamp memory 71, and transmits the read video time stamp to the video and audio synchronization controller 4 as a delayed video time stamp 49.

The concrete process of the generation of the delayed video time stamp 49 is explained using FIG. 9A. When the coded video and audio data 1, shown in FIG. 9A, is input to the video and audio reproducing device, the video and audio separator 2 separates the video time stamps (V-DTS and V-PTS) written in the header of the first video frame V(I0). The separated video time stamps 42 are stored in the video time stamp memory 71, and output in the order of first in first out. That is, the video time stamps 42 are stored in the video time stamp memory 71 in the order of (V-DTS(I0) and V(V-PTS(I0)), (V-DTS(P3) and V(V-PTS(P3)), (V-DTS (B1) and V(V-PTS(B1)) . . . .

The coded video data I0 of the first video frame V(I0) is separated by the video and audio separator 2. The separated coded video data 41 are written into the video buffer memory 45 in the order of video data I0, P3, B1, . . . . The respective head frame counts 0 (I0), 1 (P3), 2 (B1), . . . of the video data I0, P3, B1 are extracted from the coded video data 41 by the write video frame counter 91. These extracted head frame counts are written into the video frame counter memory 93 in the order of 0 (I0), 1 (P3), 2 (B) . . . .

The video data 41 which has been stored in the video buffer memory 45 are read out in the order of I0, P3, B1, . . . , and sequentially transmitted to the video decoder 50. At this time, the read video frame counter 95 reads out the head frame counts of the respective video data I0, P3, B1, . . . in the order of 0 (I0), 1 (P3), 2 (B1) . . . from the video buffer memory 45.

The head frame count 0 (I0) counted by the read video frame counter 95 is transmitted to the video frame count comparator 97, and compared with the frame count 0 (I0) stored in the head of the video frame counter memory 93. if the comparison result indicates that the frame count 0 (I0) counted by the read video frame counter 95 matches with the frame count 0 (I0) stored in the head of the video frame counter memory 93, the head video time stamps (V-DTS(I0) and V-PTS(I0)) in the video time stamp memory 71, which corresponds to the head frame count 0 (I0) stored in the head of the video frame counter memory 93, are transmitted to the video time stamp latch 79. The transmitted time stamps are latched in the video time stamp latch 79, and sent to the video and audio synchronization controller 4 as a delayed video time stamp 49. After the head frame count 0 (I0) and the head video time stamps (V-DTS(I0) and V-PTS(I0)) have been read from the video frame counter memory 93 and the video time stamp memory 71, respectively, the subsequent frame count value 1 (P3) and the video time stamps (V-DTS (P3) and V-PTS(P3)) are inserted into the heads of the respective memories.

The next frame count 1 (P3) is counted by the read video frame counter 95, and transmitted to the video frame count comparator 97, as shown in the dotted line in FIG. 9A. The video frame count comparator 97 compares the frame count 1 (P3) transmitted from the read frame counter 95 with the frame count 1 (P3) stored in the head of the video frame counter memory 93. If the comparison results indicates the frame count 1 (P3) counted by the read video frame counter 95 matches with the frame count 1 (P3) stored in the head of the video frame counter memory 93, the video time stamp memory 71 transmits the head video time stamps (V-DTS (P3) and V-PTS(P3)), which corresponds to the head frame count 1 (P3) stored in the head of the video frame counter memory 93, to the video time stamp latch 79.

In this manner, the delayed video time stamp (V-DTS(I0) and V-PTS(I0)), (V-DTS(P3) and V-PTS(P3)), (V-DTS(B1) and V-PTS(B1)) . . . and the coded video data I0, P3, B1 are transmitted to the video and audio synchronization controller 4.

Base on these delayed time stamps 49 and the delayed coded video data 48, the video and audio synchronization controller 4 generates a video output start controlling signal 52. The video decoder 50 decodes the delayed coded video data 48 based on the video output start controlling signal 52, and output the video display signal 51.

FIG. 9B explains the audio processing operation of the circuit of FIG. 8. FIG. 9B is different from FIG. 9A in that the input signals are the coded audio data 21 and audio time stamp 22 instead of coded video data 41 and the video time stamp 42, and the output signals are the delayed coded audio data 28 and the delayed audio time stamp 29 instead of the delayed coded video data 48 and the delayed audio time stamp 49, respectively. In the audio processing, the audio time stamps 22 which has been separated by the video and audio separator 2 are stored and delayed in the audio time stamp memory 61. The coded audio data 21 which have been separated by the video and audio separator 2 are sequentially written into the audio buffer memory 25. The write frame counter 81 counts the head frame count of the audio frame in the coded audio data 21, and the counted head frame is stored in the audio frame counter memory 83. The read frame counter 85 counts the audio frames stored in the audio buffer memory 25, and transmits the counted head frames to the audio frame count comparator 87. When the content of the read frame counter 85 equals to the content the audio frame counter memory 83, the audio count comparator 87 outputs the audio time stamp latch signal 68 to the audio stamp latch 69. In response to the audio stamp latch signal 68, the audio stamp latch 69 reads the audio time stamp (A-PTS) stored in the head of the audio time stamp memory 61, and transmits the audio time stamp to the video and audio synchronization controller 4 as a delayed audio time stamp 29.

More concrete explanation is omitted, since the operation shown in FIG. 9B is the same as that shown in FIG. 9A, except that the data stored in the audio time stamp memory 61 are A-PTS(A0), A-PTS (A1), A-PTS(A2) . . . , and that the data stored in the audio frame counter memory 83 are 0 (A0), 0 (A1), 0 (A2), . . . .

In this manner, the delayed audio time stamps A-PTS (A0), A-PTS (A1), A-PTS (A2) . . . and the delayed coded audio data 0 (A0), 0 (A1), 0 (A2) . . . are transmitted to the video and audio synchronization controller 4.

Based on these delayed time stamp 29 and the delayed coded audio data 28, the video and audio synchronization controller 4 generates the audio output start controlling signal 32. The audio decoder 30 decodes the delayed coded audio data 28 based on the audio output start controlling signal 32, and outputs the audio signal 31.

Embodiment 5

Figure 10:
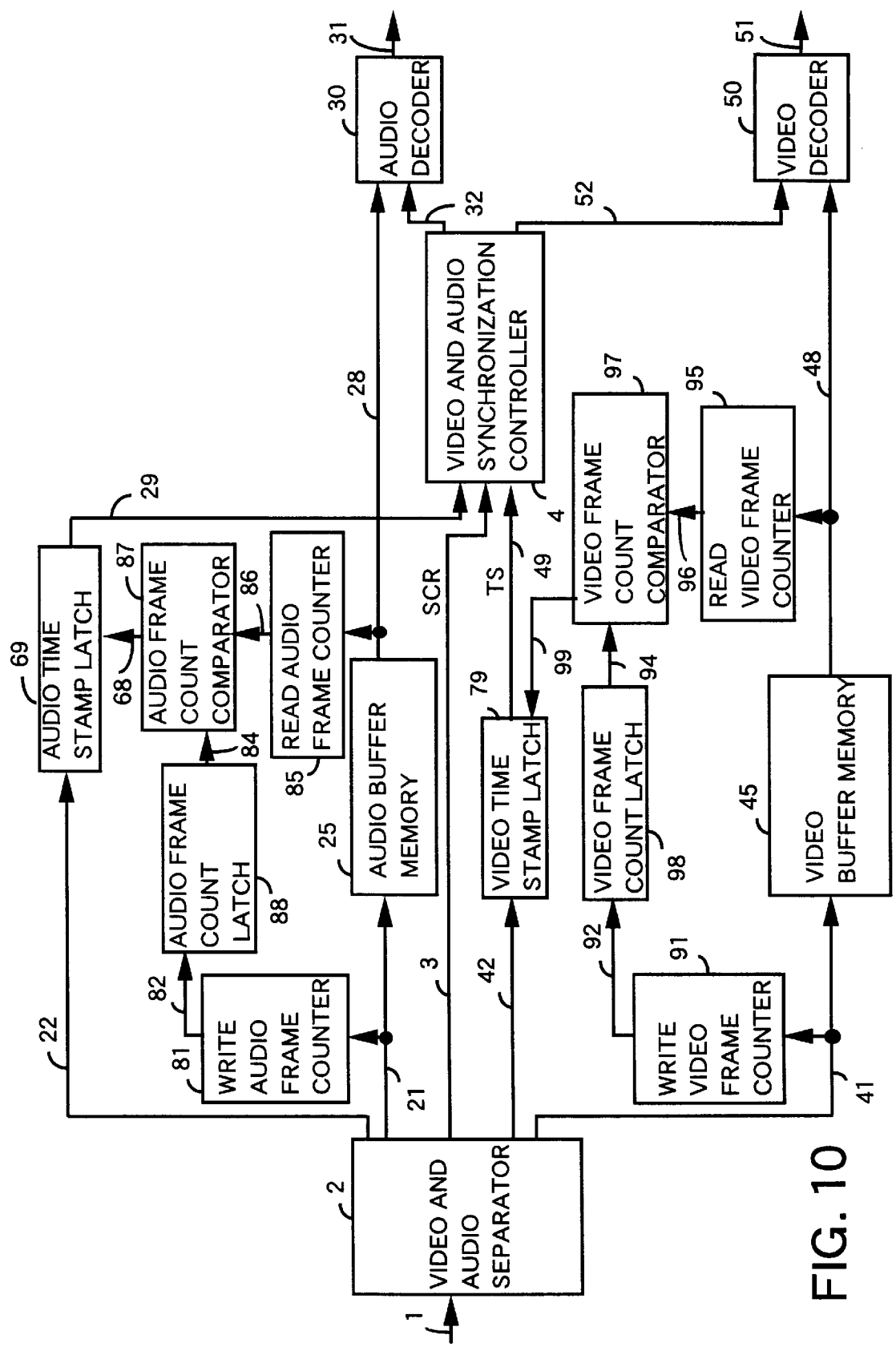
FIG. 10 shows a video and audio reproducing device according to a fifth embodiment of the present invention.

FIG. 10 shows a circuit for generating delayed audio time stamp (A-PTS) 29 and delayed video time stamp (V-PTS) 49 in the invention according to a fifth embodiment. The circuit of the fifth embodiment is different from that of the fourth embodiment in that the video time stamp memory 71 and the audio time stamp memory 61 are not included, and that a video frame count latch 98 and an audio frame count latch 88 are used instead of the video frame counter memory 93 and the audio video frame counter memory 83.

The video processing side of the circuit of FIG. 10 includes a video buffer memory 45, a write video frame counter 91, a video frame count latch 98, a read video frame counter 95, a video frame count comparator 97, and a video time stamp latch 79. The audio processing side comprises an audio buffer memory 25, a write audio frame counter 81, an audio frame count latch 88, a read audio frame counter 85, an audio frame count comparator 87, and an audio time stamp latch 69. The elements or devices having same the reference numbers in FIG. 10 as those in FIG. 4 are the same elements or devices. Therefore, their detailed explanation is omitted.

FIG. 11A explains the video processing operation of the circuit of FIG. 10. The video time stamp 42 separated by the video and audio separator 2 is directly applied to the video time stamp latch 79 and the video time stamp 42 is latched at the video time stamp latch 79. The coded video data 41, which has been also separated by the video and audio separator 2, are sequentially written into the video buffer memory 45. The write video frame counter 91 counts the respective video frames received from the coded video data 41, and the counted frame counts 92 is stored in the video frame counter 98. The read video frame counter 95 counts the respective video frames stored in the video buffer memory 45, and transmits the counted head frame counts 96 to the video frame count comparator 97. The video frame count comparator 97 compares the head fame counts 96, which has been transmitted from the read video frame counter 95, with the frame count, which is stored in the frame count latch 98. If they are equal, the video frame count comparator 97 outputs a video time stamp latch signal 78 to the video time stamp latch 79. Receiving the time stamp latch signal 78, the video time stamp latch 79 transmits the video time stamp (V-DTS and V-PTS), which has been latched in the video time stamp latch 79, to the video and audio synchronization controller 4 as a delayed video time stamp 49, and updates the video time stamp by latching the subsequent time stamp 42, which has been separated by the video and audio separator 2.

The concrete process for generating the delayed video time stamp 49 is explained using FIG. 11A. When the coded video and audio data 1, shown in FIG. 11A, is input to the video and audio reproducing device, the video and audio separator 2 separates the video time stamps (V-DTS and V-PTS) written in the header of the first video frame V(I0). At the time, the separated video time stamps 42 are latched in the video time stamp latch 79. In other words, the video time stamps 42 (V-DTS(I0) and V(V-PTS(I0)) are latched in the video time stamp latch 79. The video time stamp latch 79 does not transmit a delayed video time stamps 49 at this time.

The coded video data I0 of the first video frame V(I0) is separated by the video and audio separator 2. The separated coded video data 41 are stored into the video buffer memory 45 in the order of video data I0, P3, B1, . . . . The write video frame counter 91 counts the head frame count 0 (I0) included in the video data I0, and is stored into the video frame count latch 98. The data stored in the coded video data buffer memory 45 are read out in the order of I0, P3, B1, . . . , and transmitted to the video decoder 50 sequentially. When the first video data I0 is transmitted to the video decoder 50, the head frame count 0 (I0) in the video data I0 is read into the read video frame counter 95.

The frame count 0 (I0) which has been stored in the read video frame counter 95 is transmitted to the video frame count value comparator 97, and compared with the frame count 0 (I0) which is latched in the video frame count latch 98. If the comparison result indicates that the frame count 0 (I0) counted by the read video frame counter 95 matches with the frame count 0 (I0) latched in the video frame count latch 98, the video time stamps (V-DTS(I0) and V-PTS(I0)) latched in the video time stamp latch 79 is transmitted to the video and audio synchronization controller 4 as a delayed video time stamp 49. When the video frame count latch 98 and the video time stamp latch 79 respectively transmit the frame count value 0 (I0) and the (V-DTS(I0) and V-PTS (I0)), the subsequent frame count 2 (B1) and the video time stamp (V-DTS(B1) and V-PTS(B1)) are latched in the video frame count latch 98 and the video time stamp latch 79, respectively.

When the frame count 0 (I0) in the video frame count latch 98 and the video time stamps (V-DTS(I0) and V-PTS (I0)) in the video time stamp latch 79 are transmitted, since the frame count 1 (P3) and the video time stamps (V-DTS (P3) and V-PTS(P3)) have already passed through the video frame count latch 98 and the video time stamp latch 79, respectively, neither of them are latched in the video frame count latch 98 nor the video time stamp latch 79. Therefore, the video time stamps (V-DTS(P3) and V-PTS(P3)) are not transmitted to nor used in the video and audio synchronization controller 4. However, the video frame P3 is coded and displayed in the normal operations without being controlled by the time stamps. In this manner, the continuity in the video display is maintained.

The frame count 2 (B1) counted by the read video frame counter 95 is transmitted to the video frame count comparator 97, and compared with the frame count 2 (B1) which is latched in the video frame count latch 98. If the comparison result indicates that the frame count 2 (B1) counted in the frame counter 95 matches with the frame count 2 (B1) latched in the video frame count latch 98, the video frame count comparator 97 transmits the video time stamp latch signal 78 to the video time stamp latch 79. In response to the video time stamp latch signal 78, the video time stamp latch 79 reads the video time stamps (V-DTS(B1) and V-PTS (B1)), and transmits them to the video and audio synchronization controller 4 as a delayed time stamp 49.

In this manner, the delayed video time stamp 49 is transmitted to the video and audio synchronization controller 4 in the order of (V-DTS(I0) and V-PTS(I0)), (V-DTS (B1) and V-PTS(B1)), . . . .

Based on these delayed video time stamps 49 and the system clock reference (SCR) 3, the video and audio synchronization controller 4 generates the video output start controlling signal 52. Based on the video output start controlling signal 52, the video decoder 50 decodes the delayed coded video data 48 and outputs a video display signal 51. The coded video data B1 is transmitted from the coded video data buffer memory 45 to the video decoder 50, but the (V-DTS(P3) and V-PTS(P3)) are not output to the video and audio synchronization controller 4. Therefore, the video decoding start controlling signal 52 is not controlled by the time stamps from the video and audio synchronization controller 4, and therefore the control signals are generated to sequentially decode and display video frames under the normal control.

FIG. 11B explains the audio processing of the circuit in FIG. 10. FIG. 11B is different from FIG. 11A in that the input signals are coded audio data 21 and audio time stamps 22, and that the output signals are delayed coded audio data 21 and the delayed audio time stamp 29. In the audio processing, the video and audio separator 2 separates the audio time stamp 22, and the audio time stamp 22 is latched in the audio stamp latch 69 immediately. The coded audio data 21, which is also separated by the audio separator 2, are stored into the audio buffer memory 25 sequentially. The audio write frame counter 81 counts the frame counts 82 of the audio frame, and transmits the frame counts 82 to the audio frame count latch 88. The read audio frame counter 85 counts the audio frames stored in the audio buffer memory 25, and transmits the count to the audio frame count comparator 87. When the content of the read audio frame counter 85 becomes equal to that of audio frame count latch 88, the audio frame count comparator 87 transmits an audio time stamp latch signal 68 to the audio stamp latch 69. Receiving the audio time stamp latch signal 68, the audio stamp latch 69 transmits the audio time stamp (A-PTS) latched in the audio stamp latch 69 to the video and audio synchronization controller 4 as a delayed audio time stamp 29.

More concrete explanation is omitted, since the operation shown in FIG. 11B is the same as that shown in FIG. 11A, except that the data latched in the audio stamp latch 69 is A-PTS(A0), and that the data latched in the audio frame count latch 88 is 0 (A0).

In this manner, the delayed audio time stamps A-PTS (A0), A-PTS(A1), A-PTS(A2) . . . are transmitted to the video and audio synchronization controller 4.

Based on these delayed time stamp 29 and the system clock reference (SCR) 3, the video and audio synchronization controller 4 generates an audio output start controlling signal 32. The audio decoder 30 decodes the delayed coded video data 28 based on the audio output start controlling signal 32.

The device construction of the circuit of fifth embodiment is much simpler, since the invention according to the fifth embodiment includes only a latch for one data, instead of the video and audio time stamp memory, and address memory or a frame counter.

Embodiment 6.

Although the video signal and the audio signal are synchronized according to the video and audio time stamps, the video and audio buffer memory capacities to be empty (underflow), which stops the device operation from the hardware limitation, and makes the system hang up during the operation. The invention according to a sixth embodiment prevents the video and audio buffer memory from becoming empty (underflow), and gives a priority to the hardware limitation over the synchronization control according to the video and audio time stamps.

Figure 12A:
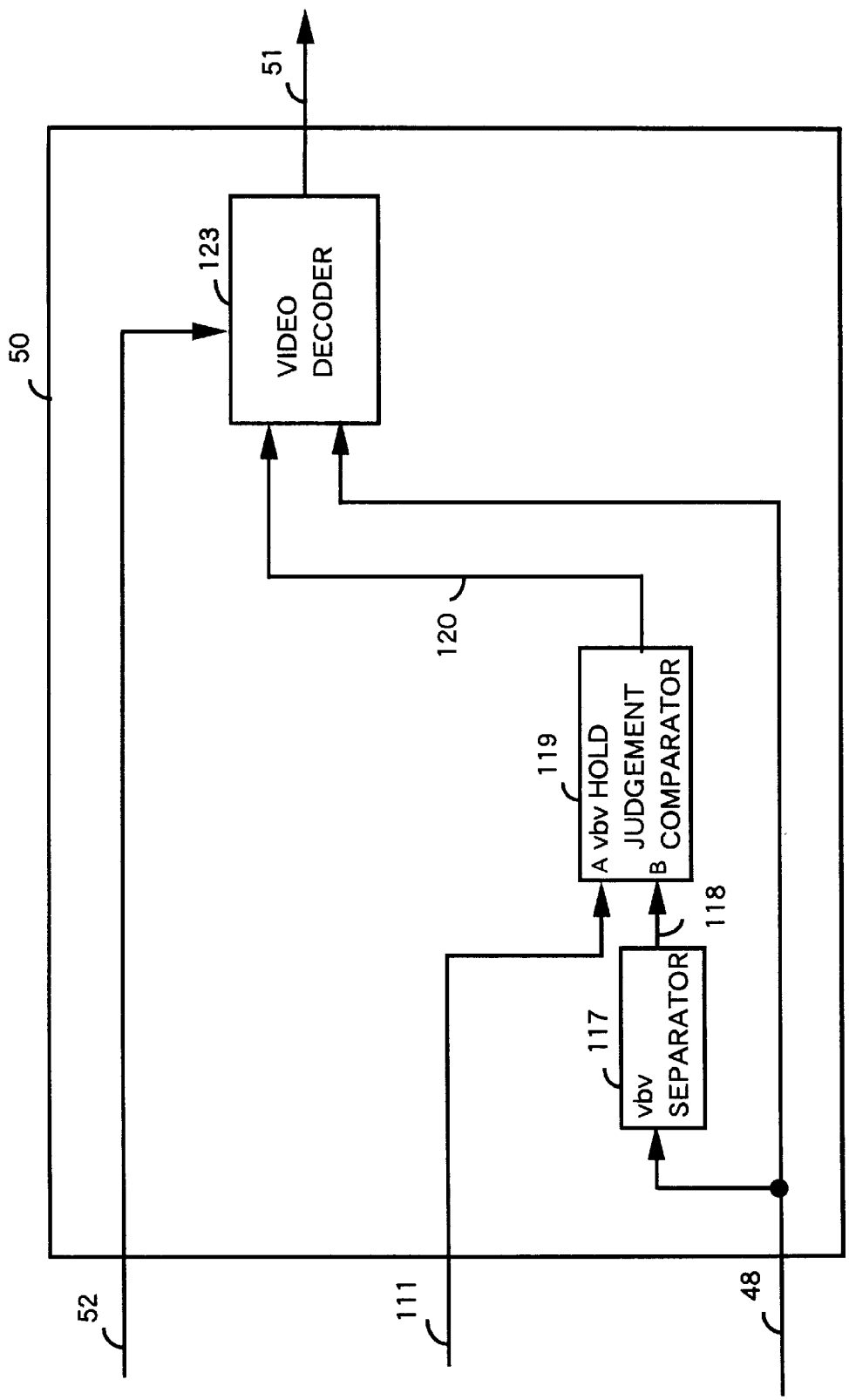
FIG. 12A shows a video decoder according to a sixth embodiment of the present invention.

FIG. 12A shows the video decoder 50. In FIG. 12A, the signal 111 denotes an storage capacity of the current video buffer memory and is indicated by a bit number corresponding to the storage capacity in the video buffer memory. The video decoder 50 includes a vbv separator 117, a vbv hold judgement comparator 119, and a video decoder 123. The vbv separator 117 outputs vbv storage indication signal 118, and the vbv hold judgement comparator 119 outputs a vbv hold control signal 120.

The operation of the invention according to the sixth embodiment is explained below using FIG. 12A. When the bit number (corresponding to the storage capacity of the video buffer memory) stored in the video buffer memory 45 becomes smaller than the vbv storage indication signal 118, an empty (underflow) condition occurs, which stops normal operation of the system, and causes the system to hang up. In the sixth embodiment, the vbv hold judgement comparator 119 compares the video buffer memory storage indication signal 111 with the vbv storage indication signal 118 which is obtained by converting the vbv delay in the vbv separator. When the storage capacity of the current video buffer memory is smaller than the vbv storage indication signal 118, the vbv hold judgement comparator 119 sends the decode holding signal 120 to the video decoder 123. In response to the decode holding signal 120, the video decoder 123 holds the video data without starting the decoding operation, in spite of the presence of the video output start controlling signal 52. On the other hand, video buffer memory 45 continues to store the video data until the storage capacity of the current video buffer memory exceeds the vbv storage indication signal 118. The vbv storage indication signal 118 corresponding to the vbv storage capacity is obtained by converting the vbv delay signal which is included in the head of the transmitted coded video and audio data 1. The synchronization control holding signal 120 prevents the system from being empty (underflow) by holding the decoding to be performed by the video decoder 123. Thereby, the coded video data are not read from the video buffer memory 45, which prevent the decrease of the memory storage amount. Although the above operation applies to the video decoding, the similar operation can be applied to the audio operation, using an almost empty threshold signal instead of the vbv storage indication signal 118 to hold the decoding operation.

The invention according to the sixth embodiment makes it possible to prevent the system from being empty and hung up, even if the storage capacities of the audio and video buffer memories decrease during synchronization control using the time stamps.

Embodiment 7.

Although the video signal and the audio signal are synchronized according to the video and audio time stamps, the video and audio buffer memory capacities to be full (overflow), which stops the device operation from the hardware limitation, and makes the system hang up during the operation. The invention according to a seventh embodiment prevents the video and audio buffer memory from becoming full (overflow), and gives a priority to the hardware limitation over the synchronization control according to the video and audio time stamps.

When the data stored in the video buffer memory exceeds the full storage capacity stored in the video buffer memory, the system might hang up unless the data input to the video buffer memory is limited. The invention according to the seventh embodiment is constructed to output a synchronization control skip signal 114 to the video decoder 123, so that the video decoder 123 skips the decoding when the video buffer memory capacity indication signal 111 exceeds the full storage capacity of the video buffer memory.

Figure 12B:
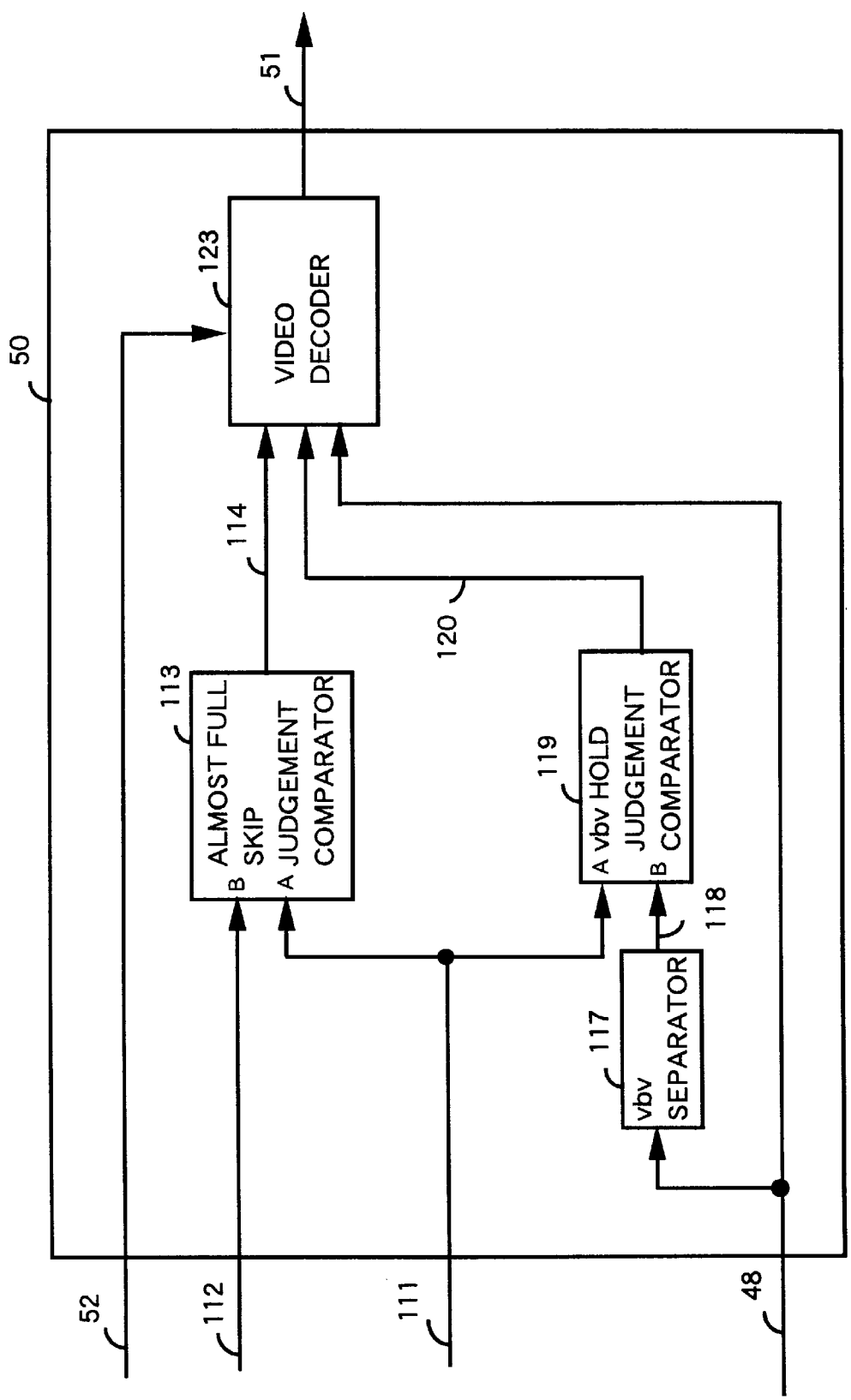
FIG. 12B shows a video decoder according to a seventh embodiment of the present invention.

FIG. 12B shows the video decoder 50. In FIG. 12B, the video decoder 123 receives the video decoding start controlling signal 52 from the video and audio synchronization controller 4. The signal 111 denotes a storage capacity of the current video buffer memory, that is, the data storage capacity currently stored in the video buffer memory. The video decoder 50 includes an almost full skip judgement comparator 113 and a video decoder 123. The almost full skip judgement comparator 113 receives the almost full threshold indication signal 112. The almost full threshold indication signal 112 has a predetermined capacity which is smaller than the maximum capacity of the video buffer memory 45, and the almost full skip judgement comparator 113 outputs an almost full skip control signal 114 as explained below. The elements having the same reference numbers in FIG. 12B are the same portions or the corresponding portions in FIG. 12A. Accordingly the detailed explanation of the same portions is omitted.

The operation of the invention according to the seventh embodiment is explained below using FIG. 12B. The video buffer memory storage indication signal 111, which indicates the storage capacity stored in the video buffer memory 45, and the almost full threshold indication signal 112 are input to the almost full skip judgment comparator 113. When video buffer memory storage indication signal 111 exceeds the almost full threshold indication signal 112, the almost full skip judgment comparator 113 generates the almost skip control signal 114.

When this almost skip control signal 114 is output to the video decoder 123, the video decoder 123 skips the coding of the coming B picture and discards the coded video data. In this manner, the data storage capacity stored in the video buffer memory 45 is reduced, which prevents the video buffer memory 45 from being full (overflow).

Embodiment 8.

The video time stamp is sometimes not included in the header of the video frames, in that case the synchronization cannot be carried out according to the video stamps. In the eighth embodiment, if the video time stamps are not included in the video frames, the decoding of the video and audio is carried after the video buffer memory capacity indication signal 111 of the first video frame exceeds the vbv storage signal 118.

Figure 13:
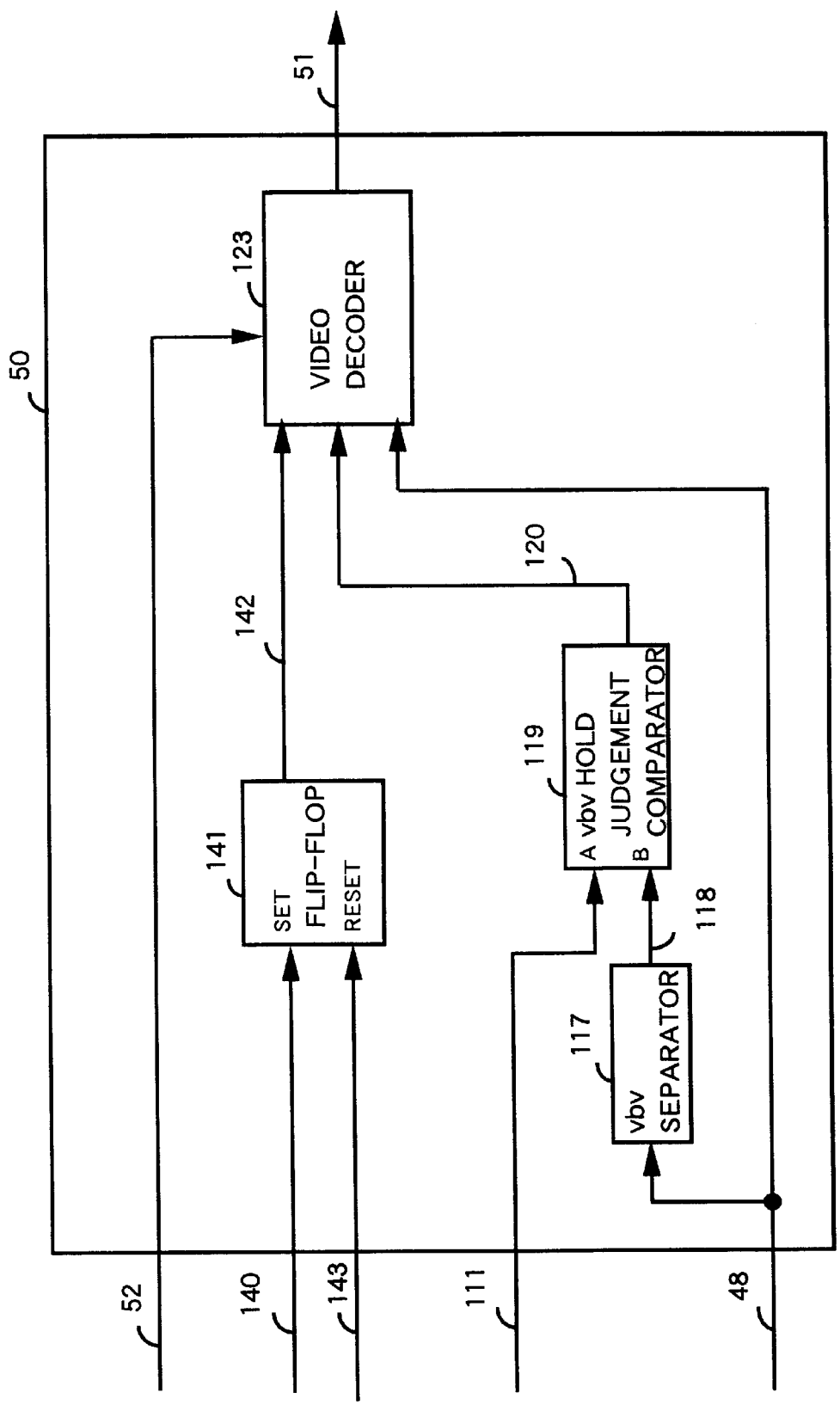
FIG. 13 shows a video decoder according to an eighth embodiment of the present invention.

FIG. 13 shows a video decoder 50 according to the eighth embodiment of the present invention. In the eighth embodiment, a flip-flop 141 is added to the circuit of the seventh embodiment shown in FIG. 12A. In FIG. 13, a video time stamp presence/absence signal 140, and a reset signal 143 are input to the flip-flop 141 in the decoder 50. The flip-flop 141 is reset by the reset signal 143 when the device is powered on or when the video sequence changes, and the flip-flop 141 outputs a flip-flop output 142 having logic "L". When the video time stamp presence/absence signal 140 recognizes that there is no time stamp in the first video frame, the flip-flop 141 in the video decoder 50 is not set and therefore continues to output logic "L". The video decoder 123 holds the start of the video decoding, if receiving the video decoding start controlling signal 52, until the first frame including a video time stamp arrives. Once the video time stamp arrives, the flip-flop 141 is reset by the video time stamp presence/absence signal 140, and starts to output logic "H". After then, the synchronization is carried out based on the video decoding start controlling signal 52.

Figure 14:
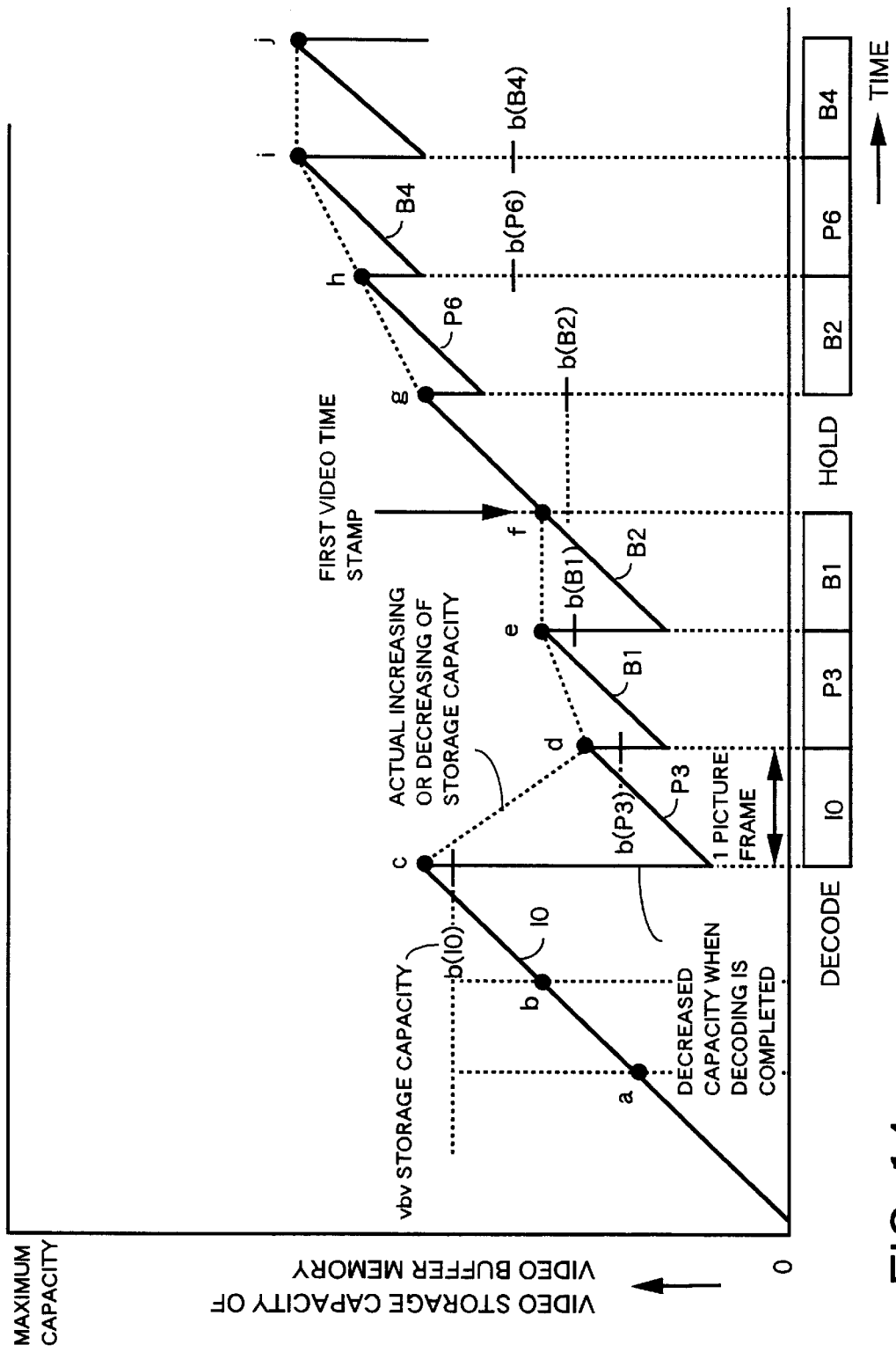
FIG. 14 shows a storage capacity in the video buffer memory and its time variation according to the eighth embodiment of the present invention.

FIG. 14 shows a data storage capacity change stored in the video buffer memory 45 during the decoding is carried out in the eighth embodiment of the present invention. In FIG. 14, the data are decoded in the order of I0, P3, B1, B1, P6, B4 . . . . The first video time stamp arrives at P6 (point "f"), which means, no time stamp appears between the point "a" and point "e". Where, I picture is an inter-coded picture, P picture is a predictive-coded picture:, and B picture is a bidirectionally predictive-coded picture. For the first three pictures I0, P3, and B1, the coding is started when the video buffer memory storage capacity exceeds the respective vbv storage capacity b(I0), b(P3), and b(B1).

Assuming that the first video time stamp appears at B2 picture, the synchronization control is started by the video output start controlling signal 52 using the video time stamp at the starting point of the B2 picture to be decoded. In this example, at the point where the first video time stamp is appeared (point "f"), the flip-flop 141 are set and the decoding of the B2 picture is stopped or held. Then, the flip-flop 141 is reset at each point (g, h, i, j, . . . ), and the synchronization control is carried out using the video time stamps by the video decoding start controlling signal 52.

The invention according to the eighth embodiment prevents the system from hanging up when no time stamp is included in the first video frame which is to be decoded.

Embodiment 9.

Figure 15:
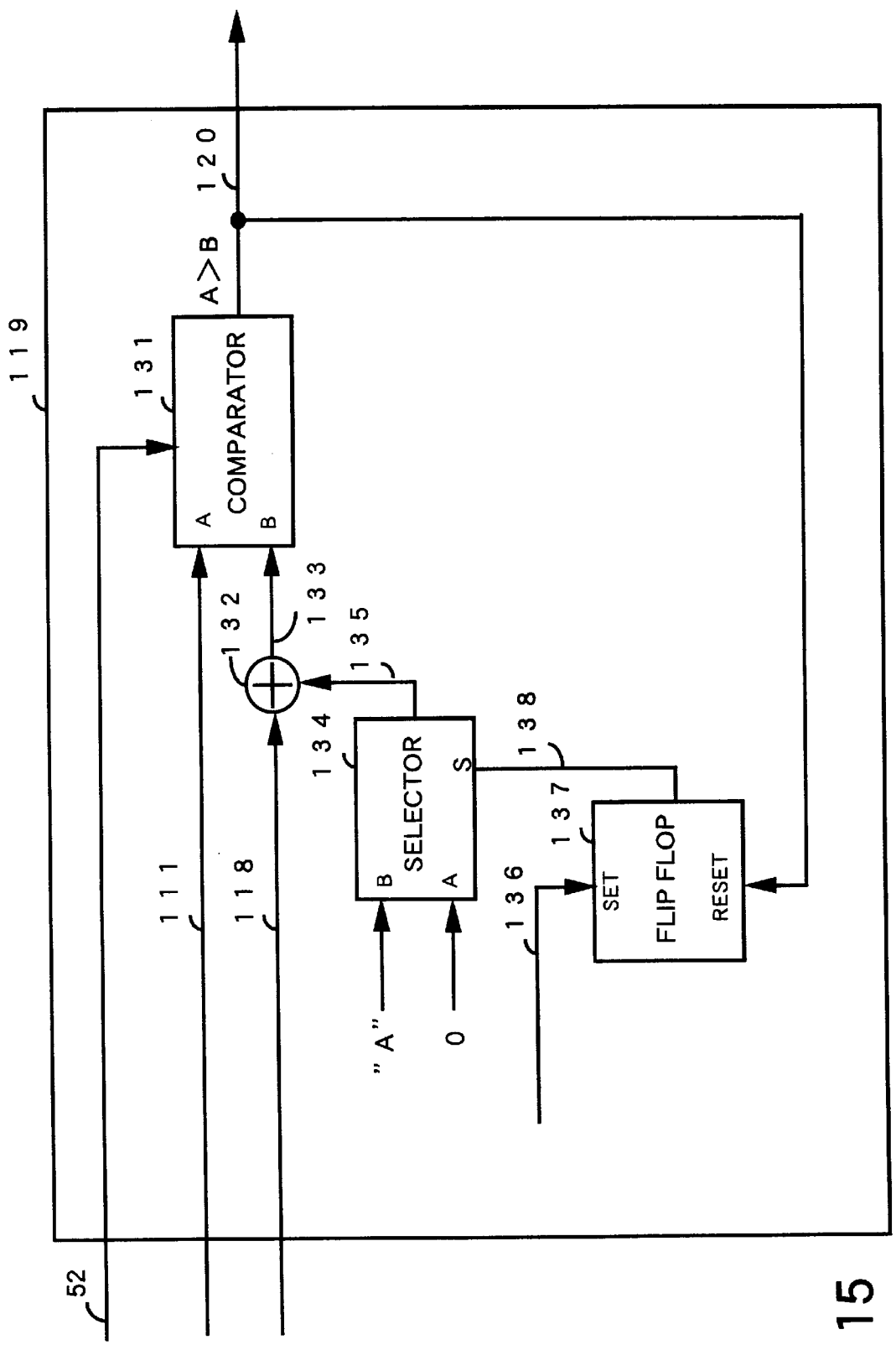
FIG. 15 shows details of a vbv hold judgement comparator according to a ninth embodiment of the present invention.

FIG. 15 shows details of a vbv hold judgement comparator according to a ninth embodiment of the present invention. When the video buffer memory capacity indication signal 111 of the first video frame barley exceeds the vbv storage indication signal 118, the video buffer memory capacity indication signal 111 for the second and subsequent frames also barely exceeds the vbv storage indication signal 118. Therefore, when the jitter or the calculation error of the video synchronization adjustment occurs, the video buffer memory capacity indication signal 111 becomes smaller than the vbv storage indication signal 118. If the video buffer memory capacity indication signal 111 becomes smaller than the vbv storage mount 118, the vbv hold judgement comparator 119 generates the decoding hold signal 120, and the video decoding temporarily stops as explained in the sixth embodiment. This stop of the video encoding might occur any time depending on the amount of the jitter. In the invention according to a ninth embodiment, the level of the vbv storage indication signal 118 is set by "A" at the first video frame. Thereby, the vbv hold judgement comparator 119 prevents the video buffer memory capacity indication signal 111 from becoming smaller than the vbv storage indication signal 118 in the second and subsequent video frames.

Figure 17:
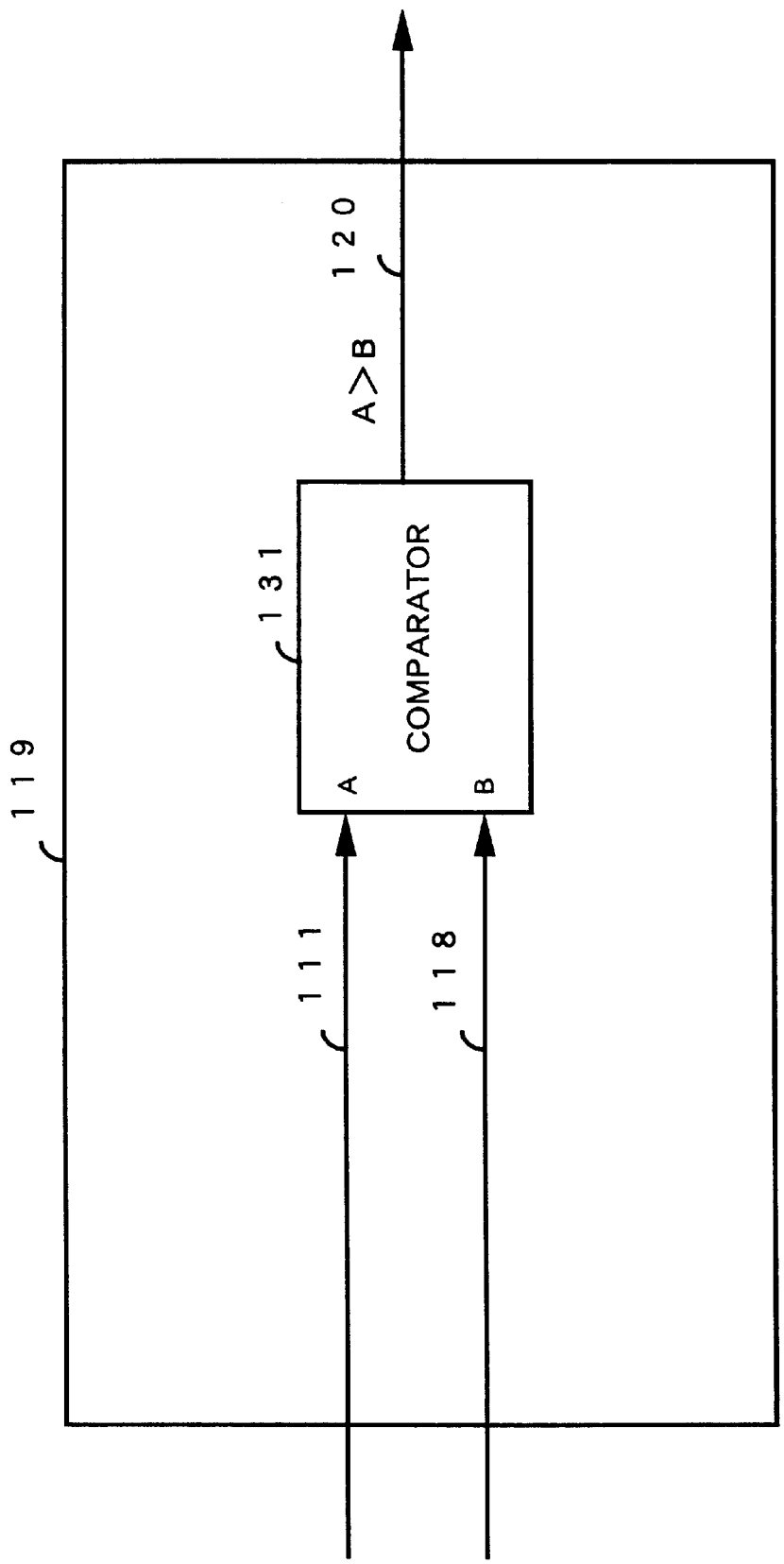
FIG. 17 shows details of a vbv hold judgement comparator according to a prior art.

FIG. 17 shows the details of a conventional vbv hold judgement comparator 119. The vbv hold judgment comparator 119 includes a comparator 131. The comparator 131 in the conventional vbv hold judgment comparator 119 simply compares the video buffer memory capacity indication signal 111 and the vbv storage indication signal 118, and sends the vbv hold control signal 120 for starting the decoding of respective video frames under the condition of the video buffer memory storage capacity>vbv storage capacity.

Figure 18:
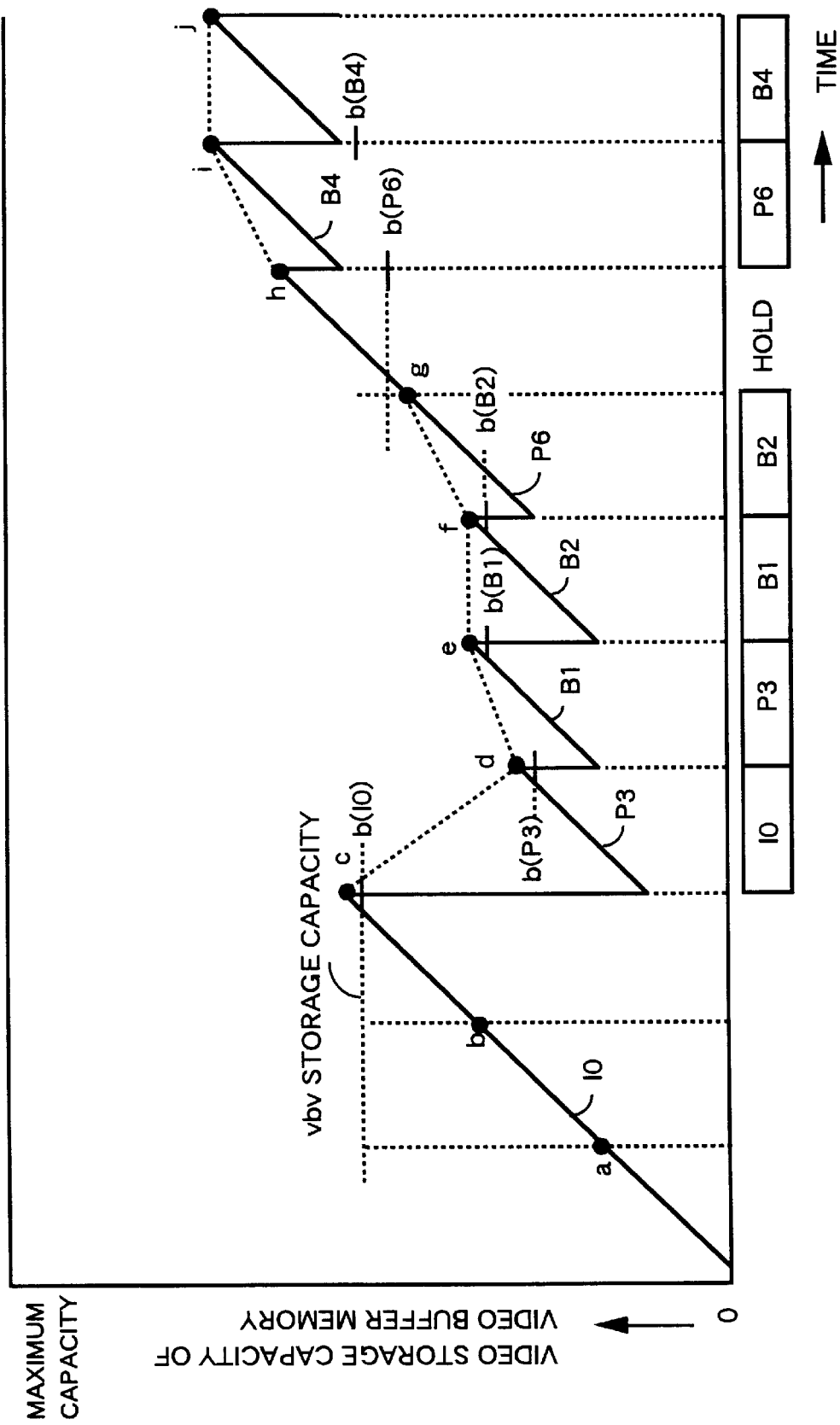
FIG. 18 shows the storage capacity of a video buffer memory and its time variation according to the prior art.

FIG. 18 shows a storage capacity change in the video buffer memory 45 during the video decoding according to a conventional decoder. As shown in FIG. 18, if the video buffer memory capacity of the first decoded video frame I0 barely exceeds the vbv storage capacity b(I0) (point "c"), the decoding for the subsequent video frames is carried out so that the video buffer memory capacity barely exceeds the vbv storage capacity (points "d", "e", and "f"). If assuming the jitter or the calculation error of the video synchronization adjustment occurs and the video buffer memory capacity indication signal 111 becomes smaller than the vbv storage indication signal 118 (b(P6)) at point "g", while the video B2 is decoded, the decoding cannot be started. If assuming the video buffer memory capacity indication signal 111 exceeds the vbv storage indication signal 118 after one frame time period, the decoding is started at point "h". Therefore, the decoding is stopped or held for one frame, and the video display is also held for one frame.

FIG. 15 shows the details of the vbv hold judgement comparator 119 according to the ninth embodiment of the present invention. The vbv hold judgement comparator 119 of FIG. 15 includes a flip-flop 137 for receiving a first frame set signal 136 and outputs logic signal 138, a selector 134 for receiving an offset signal "A", "0" signal and a logic signal 138 from the flip-flop 137, an adder 132 for adding the vbv storage indication signal 118 and the output 135 from the selector 134 and outputting the adder output 133.

The operation of the vbv hold judgement comparator 119 is explained below using FIG. 15. When receiving the first frame set signal 136, flip-flop 137 is set and outputs the flip-flop output 138 having logic "H". When receiving the flip-flop output 138 having logic "H", the selector 134 selects the offset "A" at B input terminal, and outputs the offset "A" as an output signal 138. The adder 132 adds this offset "A" and the vbv storage indication signal 118 and added value is output to the comparator 131 as an adder output 133. The comparator 131 compares the adder output 133 and the video buffer memory storage indication signal 111, and starts the decoding only for the first video frame under the condition of the video buffer memory capacity>vbv storage capacity+A. The offset A is selected to be larger than the maximum value by the jitter or calculation error.

Figure 16:
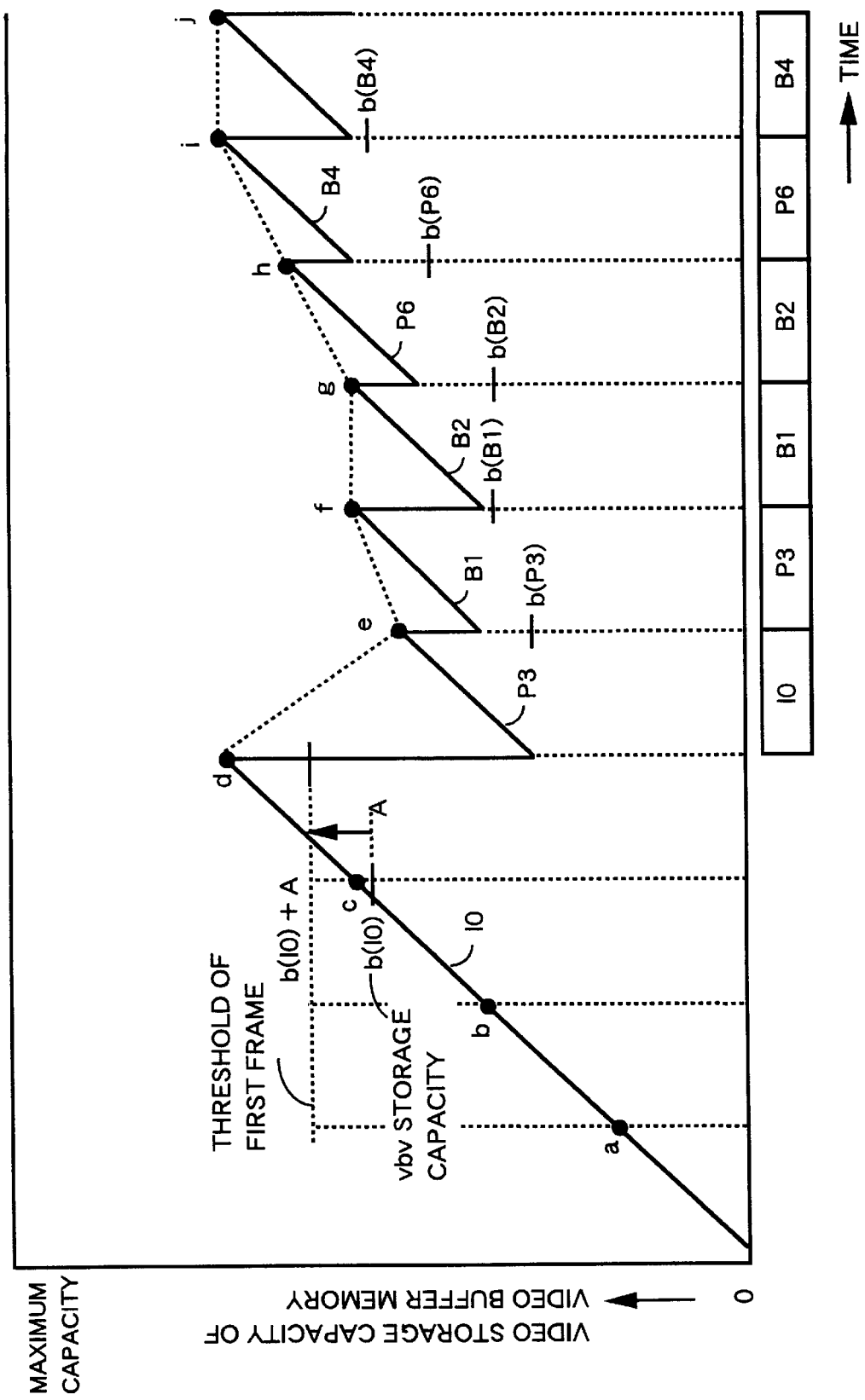
FIG. 16 shows a storage capacity of a video buffer memory and its time variation according to the ninth embodiment of the present invention.

After the decoding of the first video frame is started as shown in FIG. 16 (point "b"), since the flip-flop 137 is reset by the first frame set signal 136, the second and subsequent frames can be decoded under the condition of video buffer memory capacity>vbv storage capacity without any addition of the offset thereafter.

FIG. 16 shows the storage capacity change of the video buffer memory 45 in the ninth embodiment of the present invention. In FIG. 16, the video signal is input in the order of I0, P3, B1, B2, P6, B4, . . . , and their respective vbv storage capacities are b(I0), b(P3), b(B1), b(B2), b(P6), b(B4) . . . . According to the ninth embodiment, the vbv storage indication signal 118 of the I0 picture is b(I0), and the video buffer memory capacity indication signal 111 is shown as point "c" in FIG. 16. The difference is extremely small between the b(I0) and the video buffer memory capacity indication signal 111 at this point "c". Therefore, it is considered that the difference between the video buffer memory capacities 111 and the vbv storage capacities 118 is small for the second and subsequent video P3, B1, B2, P6, B4, . . . . In the ninth embodiment, by shifting up the vbv storage capacity b(I0) by the amount "A", the decoding of the first picture I0 at the point "c" of FIG. 16 is not carried out, that is, the decoding at the point "c" is held. In this manner, it is possible that the decoding of the second and subsequent frames are prevented from being held at points "d", "e", "f", "g", . . . .

In this manner, an offset "A" is added to the vbv storage indication signal 118 such as b(I0)+A for the first frame. As a result, the video buffer memory storage indication signal 111 of the second and subsequent frames can have a sufficient margin, therefore, the hang up or stop of the system can be prevented.

As explained above, during the normal reproducing operation, the invention according to the ninth embodiment of the present invention can prevent the video from stopping or hang up by the jitter or the calculation error for the second and subsequent video frames.

What is claimed is:

1. A video and audio reproducing device for synchronizing a decoded video output and a decoded audio output based on a video decoding start controlling signal and an audio decoding start controlling signal comprising:

a video and audio separator for separating a video time stamp, an audio time stamp coded video data and coded audio data from coded video and audio data, a video buffer memory for storing the coded video data, an audio buffer memory for storing the coded audio data, a video and audio synchronization controller for generating video decoding start controlling signal and audio decoding start controlling signal to start decoding of the coded video data and the coded audio data base on the video and audio time stamps, a video decoder for decoding the coded video data, and an audio decoder for decoding the coded audio data;

wherein said video and audio synchronization controller sets a system clock reference (SCR) included in the frame header portion of the coded video and audio data into a system time counter to set a timing of a system time clock (STC) immediately after the video and audio reproducing device has been powered on, decodes and displays a first arriving video data synchronous with a display system frame pulse, which is the closest to the value of a video time stamp included in a frame header of the first video frame on the time axis of the set STC, sets again the value of the time stamp included in the first video frame to the system time counter to update the STC, outputs the video data for the second and subsequent video frames and all the audio data synchronously with the updated STC by outputting the video and audio data when the time indicated by the video and audio time stamps arrives on the time axis of the updated STC.

2. A video and audio reproducing device for synchronizing a decoded video output and a decoded audio output based on a video decoding start controlling signal and an audio decoding start controlling signal comprising:

a video and audio separator for separating a video time stamp, an audio time stamp, coded video data and coded audio data from coded video and audio data, a video buffer memory for storing the coded video data, an audio buffer memory for storing the coded audio data, a video and audio synchronization controller for generating video decoding start controlling signal and audio decoding start controlling signal to start decoding of the coded video data and the coded audio data base on the video and audio time stamps, a video decoder for decoding the coded video data, and an audio decoder for decoding the coded audio data;

wherein said video and audio synchronization controller decodes and displays a first arriving video frame immediately after the video and audio reproducing device has been powered on, regardless of the time stamp included in a header of the first arriving video frame, sets a time stamp included in the first arriving video frame to the system time counter while the first arriving video frame is displayed to set a timing of a system time clock (STC), outputs the video data for the second and subsequent video frames and all the audio data synchronously with the set STC by outputting the video and audio data when the time indicated by the video and audio time stamps arrives on the time axis of the set STC.

3. A video and audio reproducing device for synchronizing a decoded video output and a decoded audio output based on a video decoding start controlling signal and an audio decoding start controlling signal comprising:

a video and audio separator for separating a video time stamp, an audio time stamp, coded video data and coded audio data from coded video and audio data, a video buffer memory for storing the coded video data, an audio buffer memory for storing the coded audio data, a video and audio synchronization controller for generating video decoding start controlling signal and audio decoding start controlling signal to start decoding of the coded video data and the coded audio data base on the video and audio time stamps, a video decoder for decoding the coded video data, and an audio decoder for decoding the coded audio data;

wherein on the video processing side, storing the separated video time stamps in the video time stamp memory, comparing a write address used for writing the coded video data to the video buffer memory with a read address used for reading an address at a video frame address comparator, reading and latching a head time stamp stored in the video time stamp memory, when the write address matches with the read address, supplying the latched time stamp to the video and audio synchronization controller as a video time stamp, and on the audio processing side, storing the separated audio time stamps in the audio time stamp memory, comparing a write address used for writing the coded audio data to the audio buffer memory with a read address used for reading an address temporarily stored in the audio buffer memory at an audio frame address comparator, reading and latching a head time stamp stored in the audio time stamp memory, when the write address matches with the read address, supplying the latched time stamp to the video and audio synchronization controller as an audio time stamp, and said video and audio synchronization controller generates video and audio decoding starting signals based on the video time stamp and the audio stamp, respectively, and synchronizes the video output and the audio output by decoding the coded video data and the coded audio data based on the video decoding starting signal and the audio decoding starting signal, respectively.

4. A video and audio reproducing device for synchronizing a decoded video output and a decoded audio output based on a video decoding start controlling signal and an audio decoding start controlling signal comprising:

a video and audio separator for separating a video time stamp, an audio time stamp, coded video data and coded audio data from coded video and audio data, a video buffer memory for storing the coded video data, an audio buffer memory for storing the coded audio data, a video and audio synchronization controller for generating video decoding start controlling signal and audio decoding start controlling signal to start decoding of the coded video data and the coded audio data base on the video and audio time stamps, a video decoder for decoding the coded video data, and an audio decoder for decoding the coded audio data;

wherein on the video processing side, storing the separated video time stamps in the video time stamp memory, comparing a write video frame count used for writing the coded video data to the video buffer memory with a read video frame count of the read video frame at a video frame address comparator, reading and latching a head time stamp stored in the video time stamp memory, when the write video frame count matches with the read video frame count, supplying the latched time stamp to the video and audio synchronization controller as a video time stamp, and on the audio processing side, storing the separated audio time stamps in the audio time stamp memory, comparing a write audio frame count used for writing the coded audio data to the audio buffer memory with a read audio frame count of the read audio frame at an audio frame address comparator, reading and latching a head time stamp stored in the audio time stamp memory, when the write audio frame count matches with the read audio frame count, supplying the latched time stamp to the video and audio synchronization controller as an audio time stamp; and said video and audio synchronization controller generates video and audio decoding starting signals based on the video time stamp and the audio stamp, respectively, and synchronizes the video output and the audio output by decoding the coded video data and the coded audio data based on the video decoding starting signal and the audio decoding starting signal, respectively.

5. A video and audio reproducing device for synchronizing a decoded video output and a decoded audio output based on a video decoding start controlling signal and an audio decoding start controlling signal comprising:

a video and audio separator for separating a video time stamp, an audio time stamp, coded video data and coded audio data from coded video and audio data, a video buffer memory for storing the coded video data, an audio buffer memory for storing the coded audio data, a video and audio synchronization controller for generating video decoding start controlling signal and audio decoding start controlling signal to start decoding of the coded video data and the coded audio data base on the video and audio time stamps, a video decoder for decoding the coded video data, and an audio decoder for decoding the coded audio data;

wherein on the video processing side, latching the separated video time stamps in the video time stamp latch, comparing a write video frame count used for writing the coded video data to the video buffer memory with a read video frame count of the read video frame at a video frame address comparator, reading a time stamp latched in the video time stamp latch, when the write video frame count matches with the read video frame count, supplying the latched time stamp to the video and video synchronization controller as a video time stamp, and on the audio processing side, latching the separated audio time stamps in the audio time stamp latch, comparing a write audio frame count used for writing the coded audio data to the audio buffer memory with a read audio frame count of the read audio frame at an audio frame address comparator, reading a time stamp latched in the audio time stamp latch, when the write audio fame count matches with the read audio frame count, supplying the latched time stamp to the video and audio synchronization controller as an audio time stamp; and said video and audio synchronization controller generates video and audio decoding starting signals based on the video time stamp and the audio stamp, respectively, and synchronizes the video output and the audio output by decoding the coded video data and the coded audio data based on the video decoding starting signal and the audio decoding starting signal, respectively.

6. A video and audio reproducing device for synchronizing a decoded video output and a decoded audio output based on a video decoding start controlling signal and an audio decoding start controlling signal comprising:

a video and audio separator for separating a video time stamp, an audio time stamp, coded video data and coded audio data from coded video and audio data, a video buffer memory for storing the coded video data, an audio buffer memory for storing the coded audio data, a video and audio synchronization controller for generating video decoding start controlling signal and audio decoding start controlling signal to start decoding of the coded video data and the coded audio data base on the video and audio time stamps, a video decoder for decoding the coded video data, and an audio decoder for decoding the coded audio data; and said video and audio synchronization controller includes:

a selector for selecting either a system clock reference (SCR) included in the frame header portion of the input coded video and audio data or a delayed coded video time stamp (V-TS) output from the video buffer memory;

a system time counter for generating a system time clock (STC) from the delayed coded video time stamp (V-TS) and the system clock reference (SCR);

an audio synchronization comparator for comparing the system time clock (STC) output from the system time counter and a delayed audio time stamp, and for outputting an audio decoding start controlling signal; and a video synchronization comparator for comparing the system time clock (STC) output from the system time counter and the delayed video time stamp, and for outputting a video decoding start controlling signal;

wherein said video and audio synchronization controller sets a system clock reference (SCR) included in the frame header portion of the coded video and audio data into a system time counter to set a timing of a system time clock (STC), immediately after the video and audio reproducing device has been powered on, decodes and displays a first arriving video data synchronous with a display system frame pulse, which is the closest to the value of a video time stamp included in a frame header of the first video frame on the time axis of the set STC, sets again the value of the time stamp included in the first video frame to the system time counter to update the STC, outputs the video data for the second and subsequent video frames and all the audio data synchronously with the updated STC by outputting the video and audio data when the time indicated by the video and audio time stamps arrives on the time axis of the updated STC.

7. A video and audio reproducing device for synchronizing a decoded video output and a decoded audio output based on a video decoding start controlling signal and an audio decoding start controlling signal comprising:

a video and audio separator for separating a video time stamp, an audio time stamp, coded video data and coded audio data from coded video and audio data, a video buffer memory for storing the coded video data, an audio buffer memory for storing the coded audio data, a video and audio synchronization controller for generating video decoding start controlling signal and audio decoding start controlling signal to start decoding of the coded video data and the coded audio data base on the video and audio time stamps, a video decoder for decoding the coded video data, and an audio decoder for decoding the coded audio data; and said video and audio synchronization controller includes:

a system time counter for generating a system time clock (STC) from the delayed coded video time stamp (V-TS);

an audio synchronization comparator for comparing the system time clock (STC) output from the system time counter and a delayed audio time stamp, and for outputting an audio decoding start controlling signal; and a video synchronization comparator for comparing the system time clock (STC) output from the system time counter and the delayed video time stamp, and for outputting a video decoding start controlling signal;

wherein said video and audio synchronization controller decodes and displays a first arriving video frame immediately after the video and audio reproducing device has been powered on, regardless of the time stamp included in a header of the first arriving video frame, sets a time stamp included in the first arriving video frame to the system time counter while the first arriving video frame is displayed to set a timing of a system time clock (STC), outputs the video data for the second and subsequent video frames and all the audio data synchronously with the set STC by outputting the video and audio data when the time indicated by the video and audio time stamps arrives on the time axis of the set STC.

8. A video and audio reproducing device for synchronizing a decoded video output and a decoded audio output based on a video decoding start controlling signal and an audio decoding start controlling signal comprising:

a video and audio separator for separating a video time stamp, an audio time stamp, coded video data and coded audio data from coded video and audio data, a video buffer memory for storing the coded video data, an audio buffer memory for storing the coded audio data, a video and audio synchronization controller for generating video decoding start controlling signal and audio decoding start controlling signal to start decoding of the coded video data and the coded audio data base on the video and audio time stamps, a video decoder for decoding the coded video data, and an audio decoder for decoding the coded audio data, and said device further comprises:

a video time stamp memory for storing the video time stamps separated by the audio and video separator;

a video frame address memory for sequentially storing the frame addresses of the coded video data written into the video buffer memory;

a video frame address comparator for comparing the head video frame address stored in the video frame address memory with the delayed video frame address read from the video buffer memory, and for outputting a video time stamp latch signal when they are matched with;

a video time stamp latch for latching the head video time stamp stored in the video time stamp memory by the input of the video time stamp latch signal from the video frame address comparator and for outputting the video time stamp;

an audio time stamp memory for storing the audio time stamps separated by the video and audio separator;

an audio frame address memory for sequentially storing the frame addresses of the coded audio data written into the audio buffer memory;

an audio frame address comparator for comparing the head audio frame address stored in the audio frame address memory with the delayed audio frame address read from the audio buffer memory, and for outputting an audio time stamp latch signal when they are matched with; and an audio time stamp latch for latching the head audio time stamp stored in the audio time stamp memory by the input of the audio time stamp latch signal from the audio frame address comparator and for outputting the audio time stamp;

wherein on the video processing side, storing the separated video time stamps in the video time stamp memory, comparing a write address used for writing the coded video data to the video buffer memory with a read address used for reading an address at a video frame address comparator, reading and latching a head time stamp stored in the video time stamp memory, when the write address matches with the read address, supplying the latched time stamp to the video and audio synchronization controller as a video time stamp, and on the audio processing side, storing the separated audio time stamps in the audio time stamp memory, comparing a write address used for writing the coded audio data to the audio buffer memory with a read address used for reading an address temporarily stored in the audio buffer memory at an audio frame address comparator, reading and latching a head time stamp stored in the audio time stamp memory, when the write address matches with the read address, supplying the latched time stamp to the video and audio synchronization controller as an audio time stamp, and said video and audio synchronization controller generates video and audio decoding starting signals based on the video time stamp and the audio stamp, respectively, and synchronizes the video output and the audio output by decoding the coded video data and the coded audio data based on the video decoding starting signal and the audio decoding starting signal, respectively.

9. A video and audio reproducing device for synchronizing a decoded video output and a decoded audio output based on a video decoding start controlling signal and an audio decoding start controlling signal comprising:

a video and audio separator for separating a video time stamp, an audio time stamp, coded video data and coded audio data from coded video and audio data, a video buffer memory for storing the coded video data, an audio buffer memory for storing the coded audio data, a video and audio synchronization controller for generating video decoding start controlling signal and audio decoding start controlling signal to start decoding of the coded video data and the coded audio data base on the video and audio time stamps, a video decoder for decoding the coded video data, and an audio decoder for decoding the coded audio data, and said device further comprising:

a video time stamp memory for storing the video time stamps separated by the video and audio separator;

a video frame counter memory for sequentially storing the frame counts of the coded video data written into the video buffer memory;

a video frame count comparator for comparing the head frame count stored in the video frame counter memory with the delayed video frame count read from the video buffer memory, and for outputting the time stamp latch signal when they are matched with;

a video time stamp latch for latching the head video time stamp stored in the video time stamp memory by the video time stamp latch signal from the frame count comparator, and for outputting the video time stamp;

an audio time stamp memory for storing the audio time stamps separated by the video and audio separator;

an audio frame counter memory for sequentially storing the frame counts of the coded audio data written into the audio buffer memory;

an audio frame count comparator for comparing the head frame count stored in the audio frame counter memory with the delayed audio frame count read from the audio buffer memory, and for outputting the time stamp latch signal when they are matched with; and an audio time stamp latch for latching the head audio time stamp stored in the audio time stamp memory by the audio time stamp latch signal from the frame count comparator, and for outputting the audio time stamp;

wherein on the video processing side, storing the separated video time stamps in the video time stamp memory, comparing a write video frame count used for writing the coded video data to the video buffer memory with a read video frame count of the read video frame at a video frame address comparator, reading and latching a head time stamp stored in the video time stamp memory, when the write video frame count matches with the read video frame count, supplying the latched time stamp to the video and audio synchronization controller as a video time stamp, and on the audio processing side, storing the separated audio time stamps in the audio time stamp memory, comparing a write audio frame count used for writing the coded audio data to the audio buffer memory with a read audio frame count of the read audio frame at an audio frame address comparator, reading and latching a head time stamp stored in the audio time stamp memory, when the write audio frame count matches with the read audio frame count, supplying the latched time stamp to the video and audio synchronization controller as an audio time stamp; and said video and audio synchronization controller generates video and audio decoding starting signals based on the video time stamp and the audio stamp, respectively, and synchronizes the video output and the audio output by decoding the coded video data and the coded audio data based on the video decoding starting signal and the audio decoding starting signal, respectively.

10. A video and audio reproducing device for synchronizing a decoded video output and a decoded audio output based on a video decoding start controlling signal and an audio decoding start controlling signal comprising:

a video and audio separator for separating a video time stamp, an audio time stamp, coded video data and coded audio data from coded video and audio data, a video buffer memory for storing the coded video data, an audio buffer memory for storing the coded audio data, a video and audio synchronization controller for generating video decoding start controlling signal and audio decoding start controlling signal to start decoding of the coded video data and the coded audio data base on the video and audio time stamps, a video decoder for decoding the coded video data, and an audio decoder for decoding the coded audio data, and said device further comprising:

a video frame count latch for latching the frame count of the coded video data written into the video buffer memory;

a frame count comparator for comparing the video frame count stored in the video frame count latch with the delayed video frame count read from the video buffer memory, and for outputting a video time stamp latch signal when they are matched with;

a video time stamp latch for latching the video time stamp separated by the video and audio separator, and for outputting the video time stamp latched by the video time stamp latch signal from the video frame count comparator;

an audio frame count latch for latching the frame count of the coded audio data written into the audio buffer memory;

a frame count comparator for comparing the audio frame count stored in the audio frame count latch with the delayed audio frame count read from the audio buffer memory, and for outputting an audio time stamp latch signal when they are matched with; and an audio time stamp latch for latching the audio time stamp separated by the video and audio separator, and for outputting the audio time stamp latched by the audio time stamp latch signal from the audio frame count comparator;

wherein on the video processing side, latching the separated video time stamps in the video time stamp latch, comparing a write video frame count used for writing the coded video data to the video buffer memory with a read video frame count of the read video frame at a video frame address comparator, reading a time stamp latched in the video time stamp latch, when the write video frame count matches with the read video frame count, supplying the latched time stamp to the video and video synchronization controller as a video time stamp, and on the audio processing side, latching the separated audio time stamps in the audio time stamp latch, comparing a write audio frame count used for writing the coded audio data to the audio buffer memory with a read audio frame count of the read audio frame at an audio frame address comparator, reading a time stamp latched in the audio time stamp latch, when the write audio frame count matches with the read audio frame count, supplying the latched time stamp to the video and audio synchronization controller as an audio time stamp; and said video and audio synchronization controller generates video and audio decoding starting signals based on the video time stamp and the audio stamp, respectively, and synchronizes the video output and the audio output by decoding the coded video data and the coded audio data based on the video decoding starting signal and the audio decoding starting signal, respectively.

11. A video decoder for decoding video coded data by a video decoding start controlling signal comprising:

a vbv separator for separating a vbv delay included in a header of coded video data, and for obtaining a corresponding vbv storage capacity; and a vbv hold judgement comparator for comparing the vbv storage capacity with a current actual video buffer memory capacity, for sending an ON hold signal when the actual video buffer memory capacity<vbv storage capacity, and for sending an OFF hold signal when the actual video buffer memory capacity≧vbv storage capacity;

wherein said decoder holds the decoding when the ON hold signal is appeared regardless of the video decoding start controlling signal, and starts the decoding when the OFF hold signal is appeared.

12. The video decoder according to claim 11 further comprising:

an almost full skip judgement comparator for comparing the predetermined almost full threshold value and the current actual video buffer memory capacity;

wherein the almost full skip control signal is activated for skipping the next stage decoding when the actual buffer storage capacity is at least equal to the almost full threshold value, and non-activated for starting the next stage decoding according the decoding starting control signal when the actual buffer storage capacity is smaller than the almost full threshold value.

13. The video decoder according to claim 11 further comprising:

a flip-flop to be set when there is no time stamp in the video frame, and to be reset when a first video time stamp arrives;

wherein the decoding is controlled by the output signal from the vbv hold judgement comparator when the flip-flop is set, and the decoding is controlled by the video output starting control signal after the first video time stamp have arrived.

14. The video decoder according to claim 11, wherein said vbv hold judgement comparator comprises:

a first means for outputting the signal to recognize the first frame;

a selector for selecting a predetermined offset level (A) for preventing the video signal from being held by decoding timing jitter when the output of the first means have recognized the first frame, and for selecting zero offset level after the output of the first means have once recognized the first frame; and an adder for adding the output of the selector and the vbv storage capacity output from the vbv separator;

wherein the comparator compares the output of the adder with the actual video buffer memory capacity, for the first frame, the comparator outputs an ON hold signal when the actual video buffer memory capacity<output of the adder (=vbv storage capacity+A) is satisfied, and outputs an OFF hold signal when the actual video buffer memory capacity≧the output of the adder (=vbv storage capacity+A) is satisfied, for the second and subsequent frames, the comparator outputs an ON hold signal when the actual video buffer memory capacity<output of the adder (=vbv storage capacity) is satisfied, and outputs an OFF hold signal when the actual video buffer memory capacity≧the output of the adder (=vbv storage capacity) is satisfied.

* * * * *